United States Patent
Jang et al.

(10) Patent No.: US 10,869,261 B2
(45) Date of Patent: Dec. 15, 2020

(54) METHOD AND APPARATUS FOR DETERMINING COMMUNICATION METHOD BETWEEN BASE STATION AND TERMINAL IN WIRELESS COMMUNICATION SYSTEM

(71) Applicants: Samsung Electronics Co., Ltd., Gyeonggi-do (KR); KOREA ADVANCED INSTITUTE OF SCIENCE AND TECHNOLOGY, Daejeon (KR)

(72) Inventors: Jaehyuk Jang, Suwon-si (KR); Wooseong Kim, Gwacheon-si (KR); Yung Yi, Daejeon (KR); Boram Jin, Incheon (KR); Segi Kim, Seoul (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 75 days.

(21) Appl. No.: 15/537,393

(22) PCT Filed: Dec. 3, 2015

(86) PCT No.: PCT/KR2015/013168
§ 371 (c)(1),
(2) Date: Jun. 16, 2017

(87) PCT Pub. No.: WO2016/099058
PCT Pub. Date: Jun. 23, 2016

(65) Prior Publication Data
US 2017/0353914 A1  Dec. 7, 2017

(30) Foreign Application Priority Data
Dec. 16, 2014  (KR) .......................... 10-2014-0181763

(51) Int. Cl.
*H04W 48/16* (2009.01)
*H04W 72/04* (2009.01)
(Continued)

(52) U.S. Cl.
CPC ........... *H04W 48/16* (2013.01); *H04W 48/18* (2013.01); *H04W 72/0453* (2013.01); *H04W 84/12* (2013.01); *H04W 88/06* (2013.01)

(58) Field of Classification Search
CPC . H04W 48/16; H04W 72/0453; H04W 48/18; H04W 88/06; H04W 84/12; H04W 24/02; H04W 88/08; Y02D 70/00
See application file for complete search history.

(56) References Cited

U.S. PATENT DOCUMENTS

2013/0265985 A1* 10/2013 Salkintzis ............. H04W 76/12
                                                                370/331
2014/0204929 A1   7/2014 Cho et al.
(Continued)

FOREIGN PATENT DOCUMENTS

KR   20130106326 A   9/2013
KR   20140133232 A   11/2014
(Continued)

*Primary Examiner* — Omar J Ghowrwal

(57) ABSTRACT

The present invention relates to a method for determining a communication method between a base station and a terminal and, more particularly, to a method and an apparatus allowing a base station to lead the setting of a communication method including wireless LAN communication between the base station and the terminal. The method by which a first network base station determines the communication method, according to an embodiment of the present invention, comprises the steps of: receiving access related information from an access point of the terminal and a second network; and determining the communication method with the terminal among a plurality of communication methods on the basis of the access related information, (Continued)

wherein the plurality of communication methods comprise a first network dedicated carrier aggregation, a second network dedicated carrier aggregation or a carrier aggregation between the first network and the second network. According to an embodiment of the present invention, the method and the apparatus for determining the communication method between the base station and the terminal enable users to obtain a higher quality of experience by allowing an LTE base station to lead the determining of the communication method, by considering a user preference and a present network state, and can improve the communication performance by reducing a load inside the network. Disclosed is a 5G or pre-5G communication system to be provided for supporting a data transmission rate higher than that of a 4G communication system, such as the LTE, and subsequent systems.

10 Claims, 26 Drawing Sheets

(51) Int. Cl.
*H04W 48/18* (2009.01)
*H04W 24/02* (2009.01)
*H04W 88/08* (2009.01)
*H04W 88/06* (2009.01)
*H04W 84/12* (2009.01)

(56) References Cited

U.S. PATENT DOCUMENTS

| | | |
|---|---|---|
| 2014/0241183 A1 | 8/2014 | Comeau |
| 2014/0335882 A1 | 11/2014 | Lee et al. |
| 2015/0055572 A1* | 2/2015 | Ishikura ............... H04W 72/048 |
| | | 370/329 |
| 2015/0092688 A1 | 4/2015 | Jeong et al. |
| 2015/0117411 A1 | 4/2015 | Jeong et al. |
| 2016/0219475 A1* | 7/2016 | Kim .......................... H04L 5/00 |

FOREIGN PATENT DOCUMENTS

| | | |
|---|---|---|
| KR | 20140133392 A | 11/2014 |
| KR | 20140133463 A | 11/2014 |
| WO | 2014132143 A1 | 9/2014 |

* cited by examiner

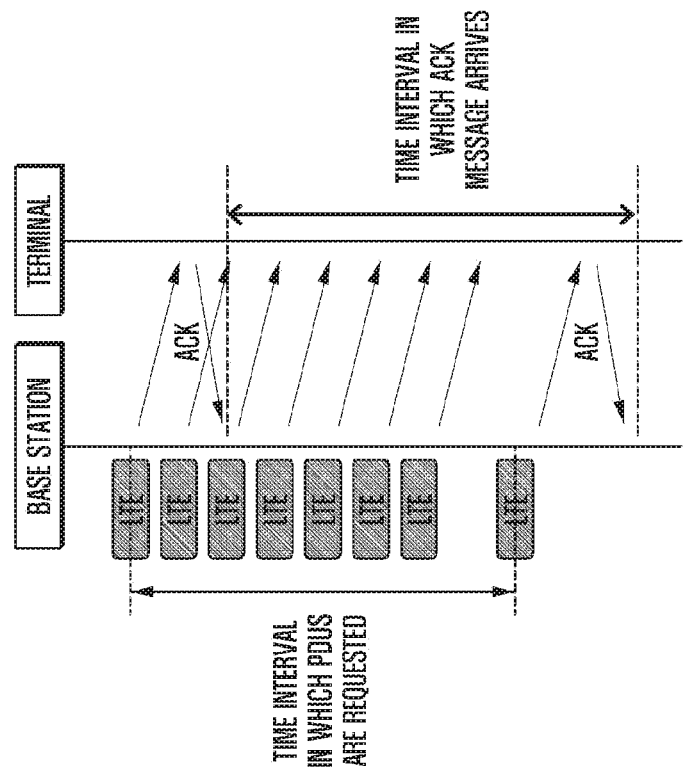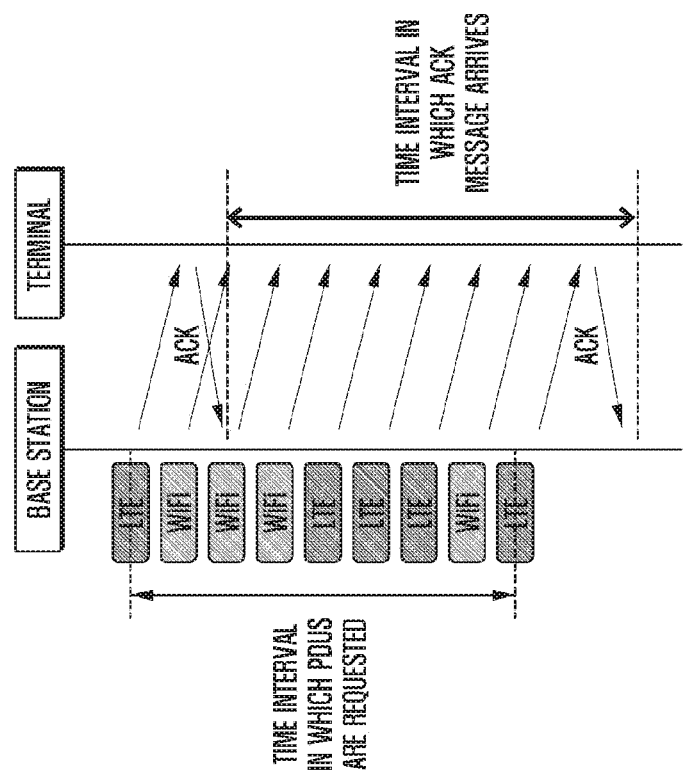

METHOD AND APPARATUS FOR DETERMINING COMMUNICATION METHOD BETWEEN BASE STATION AND TERMINAL IN WIRELESS COMMUNICATION SYSTEM

CROSS-REFERENCE TO RELATED APPLICATION(S) AND CLAIM OF PRIORITY

The present application claims priority under 35 U.S.C. § 365 to International Patent Application No. PCT/KR2015/013168 filed Dec. 3, 2015, entitled "METHOD AND APPARATUS FOR DETERMINING COMMUNICATION METHOD BETWEEN BASE STATION AND TERMINAL IN WIRELESS COMMUNICATION SYSTEM", and, through International Patent Application No. PCT/KR2015/013168, to Korean Patent Application No. 10-2014-0181763 filed Dec. 16, 2014, each of which are incorporated herein by reference into the present disclosure as if fully set forth herein.

TECHNICAL FIELD

The present invention relates to a method and an apparatus for determining a communication method between a base station and a terminal, and more particularly, to a method and an apparatus for configuring a communication method that includes wireless LAN communications between a base station and a terminal under the lead of the base station.

BACKGROUND

In order to meet the wireless data traffic demand that is on an increasing trend after commercialization of 4G communication system, efforts for developing improved 5G communication system or pre-5G communication system have been made. For this reason, the 5G communication system or pre-5G communication system has been called beyond 4G network communication system or post LTE system.

In order to achieve high data rate, implementation of 5G communication system in a millimeter Wave (mmWave) band (e.g., like 60 GHz band) has been considered. In order to mitigate a radio wave path loss and to increase a radio wave transmission distance in the mmWave band, technologies of beam-forming, massive MIMO, Full Dimension MIMO (FD-MIMO), array antenna, analog beam-forming, and large scale antenna for the 5G communication system have been discussed.

Further, for system network improvement in the 5G communication system, technology developments have been made for an evolved small cell, advanced small cell, cloud Radio Access Network (cloud RAN), ultra-dense network, Device to Device communication (D2D), wireless backhaul, moving network, cooperative communication, Coordinated Multi-Points (CoMP), and reception interference cancellation.

In addition, Hybrid FSK and QAM Modulation (FQAM) and Sliding Window Superposition Coding (SWSC), which correspond to Advanced Coding Modulation (ACM) system, and Filter Bank Multi Carrier (FBMC), Non-Orthogonal Multiple Access (NOMA), and Sparse Code Multiple Access (SCMA), which correspond to advanced connection technology, have been developed in the 5G system. In general, a mobile communication system has been developed for the purpose of providing communications while securing user's mobility. With the rapid progress of technology, such a mobile communication system can now provide not only voice communications but also high-speed data communication services.

As one of the next-generation of mobile communication systems, standardization of a Long Term Evolution (LTE) system in the 3rd Generation Partnership Project (3GPP) is recently underway. The LTE system is a technology to implement high-speed packet-based communications having a transmission speed of about 100 Mbps at maximum, and the standardization thereof has almost been completed at present.

Recently, discussion of an LTE-Advanced (LTE-A) system has been regularized, which improves the transmission speed through grafting of various new technologies on the LTE communication system. A representative one of newly introduced technologies may be carrier aggregation. Unlike a case where a terminal performs data transmission/reception using one forward carrier and one reverse carrier as in the related art, the carrier aggregation corresponds to a case where one terminal uses a plurality of forward carriers and a plurality of reverse carriers.

In performing the carrier aggregation in an LTE base station (evolved Node-B (eNB)), according to the current technology, there are many cases where users in an LTE cell overlap each other. In consideration of such cases, introduction of a carrier aggregation technology that can improve the user performance is needed.

Further, a method is proposed, in which a base station can efficiently use a network through selection of one communication method for a terminal among an LTE system, a wireless LAN, and simultaneous usage of an LTE cell and the wireless LAN based on different carrier aggregation technology through a reflection of terminal preferences.

SUMMARY

The present invention has been made in order to solve the above problems, and an aspect of the present invention provides a method and an apparatus for determining and configuring one communication method among LTE base station dedicated communication, wireless LAN dedicated communication, and communication using different carrier aggregation between an LTE base station and a wireless LAN access point so that the LTE base station can consider user preferences during the communication with a terminal and can efficiently use a network.

In one aspect of the present invention, a method for causing a first network base station to determine a communication method in a wireless communication system includes receiving access related information from a terminal and an access point of a second network; and determining the communication method with the terminal among a plurality of communication methods on the basis of the access related information, wherein the plurality of communication methods include a first network dedicated carrier aggregation, a second network dedicated carrier aggregation, and a carrier aggregation between the first network and the second network.

In another aspect of the present invention, a method for supporting an access point of a second network to determine a communication method in a wireless communication system includes receiving configuration related information for configuring a carrier of the second network into a terminal from a base station of a first network using a plurality of queues if the base station of the first network and the terminal communicate with each other in a carrier aggregation method between the first network and the second network; and transmitting the configuration related information to the terminal on the basis of terminal related information included in the configuration related information, wherein reception using the plurality of queues is based on allocated bearer related information included in the configuration related information.

In still another aspect of the present invention, a method for supporting a carrier aggregation of a terminal in a wireless communication system includes transmitting access related information of an access point of a second network and the terminal to a base station of a first network; and communicating with at least one of the base station of the first network and the access point of the second network in accordance with a communication method that is determined by the base station of the first network among a plurality of communication methods on the basis of the transmitted access related information, wherein the plurality of communication methods include a first network dedicated carrier aggregation, a second network dedicated carrier aggregation, and a carrier aggregation between the first network and the second network.

In still another aspect of the present invention, a first network base station that determines a communication method in a wireless communication system includes a communication unit configured to transmit/receive signals to/from at least one of a terminal and an access point of a second network; and a controller configured to receive access related information from the terminal and the access point of the second network, and to determine the communication method with the terminal among a plurality of communication methods on the basis of the access related information, wherein the plurality of communication methods include a first network dedicated carrier aggregation, a second network dedicated carrier aggregation, and a carrier aggregation between the first network and the second network.

In still another aspect of the present invention, an access point of a second network that supports determination of a communication method in a wireless communication system includes a communication unit configured to transmit/receive signals to/from at least one of a base station of a first network and a terminal; and a controller configured to receive configuration related information for configuring a carrier of the second network into the terminal from the base station of the first network using a plurality of queues and to transmit the configuration related information to the terminal on the basis of terminal related information included in the configuration related information if the base station of the first network and the terminal communicate with each other in a carrier aggregation method between the first network and the second network, wherein reception using the plurality of queues is based on allocated bearer related information included in the configuration related information.

In still another aspect of the present invention, a terminal that supports a carrier aggregation in a wireless communication system includes a communication unit configured to transmit/receive signals to/from at least one of a base station of a first network and a terminal of a second network; and a controller configured to transmit access related information of an access point of the second network and the terminal to the base station of the first network, and to communicate with at least one of the base station of the first network and the access point of the second network in accordance with a communication method that is determined by the base station of the first network among a plurality of communication methods on the basis of the transmitted access related information, wherein the plurality of communication methods include a first network dedicated carrier aggregation, a second network dedicated carrier aggregation, and a carrier aggregation between the first network and the second network.

In accordance with the wireless LAN communication method that is considered according to the present invention, the base station transfers the data of the terminal, which is transmitted to the base station, to the Access Point (AP) of the wireless LAN, and the terminal receives the data. Since the wireless LAN is used under the lead of the base station, it can be used efficiently and sensitively to a change, and a load in the network can be reduced. Further, even if the data is cut off due to the change of the wireless LAN, it is possible for the terminal to immediately receive the data through the LTE cell, and thus user's Quality of Experience (QoE) can be increased.

BRIEF DESCRIPTION OF THE DRAWINGS

FIGS. 20A and 20B are diagrams explaining a method for measuring bandwidths of paths of an LTE base station and an access point of a wireless LAN according to an embodiment of the present invention;

DETAILED DESCRIPTION

Figure 1:
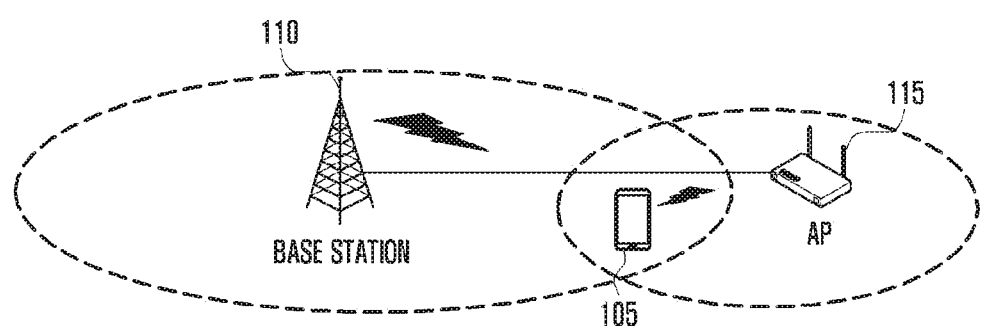
FIG. 1 is a diagram illustrating the structure in which an LTE system and a wireless LAN system coexist.

Hereinafter, embodiments of the present invention will be described in detail with reference to the accompanying drawings.

In describing the embodiments of the present invention, explanation of the technical contents that are well known in the art to which the present invention pertains and are not directly related to the present invention will be omitted to avoid obscuring the subject matter of the present invention and to transfer the same more accurately.

For the same reason, in the accompanying drawings, some constituent elements are exaggerated, omitted, or roughly illustrated. Further, sizes of some constituent elements may not completely reflect the actual sizes thereof. In the drawings, the same drawing reference numerals are used for the same elements across various figures.

The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer-usable or computer-readable memory that can direct a computer or another programmable data processing apparatus to function in a particular manner, such that the instructions stored in the computer-usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used in an embodiment, means, but is not limited to, a software or hardware component, such as FPGA or ASIC, which performs certain tasks. However, a unit does not mean that it is limited to software or hardware. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, components and units may be implemented to reproduce one or more CPUs in a device or a security multimedia card.

FIG. 1 is a diagram illustrating the structure in which an LTE system and a wireless LAN system coexist.

Referring to FIG. 1, User Equipment (User next-generation Equipment: hereinafter referred to as "UE" or "terminal") 105 is connected to both an LTE system and a Wireless Local Area Network (WLAN) system. In a wireless access network of the LTE system, the terminal connects to an external network through an evolved NodeB (hereinafter referred to as "eNB" or "base station") 110, and in the wireless LAN system, the terminal connects to the external network through a wireless Access Point (AP) 115. The base station 110 includes the evolved NodeB that is a base station in a typical LTE system and the base station, and in the present invention, the base station and the eNB are mixedly used. The wireless LAN system is used as the same meaning as a Wireless Fidelity (WIFI) system, and in the present invention, they are mixedly used. In the present invention, a situation in which the base station 110 and the AP 115 are connected to each other by wire is considered. In this case, they may be connected physically by one hop through the Ethernet, or may be connected through several hops on the basis of the existing network. Further, the LTE system and the wireless LAN system are different kinds of communication systems, and in the present invention, a first network system may indicate an LTE system, and a second network system may indicate a wireless LAN system.

Figure 2:
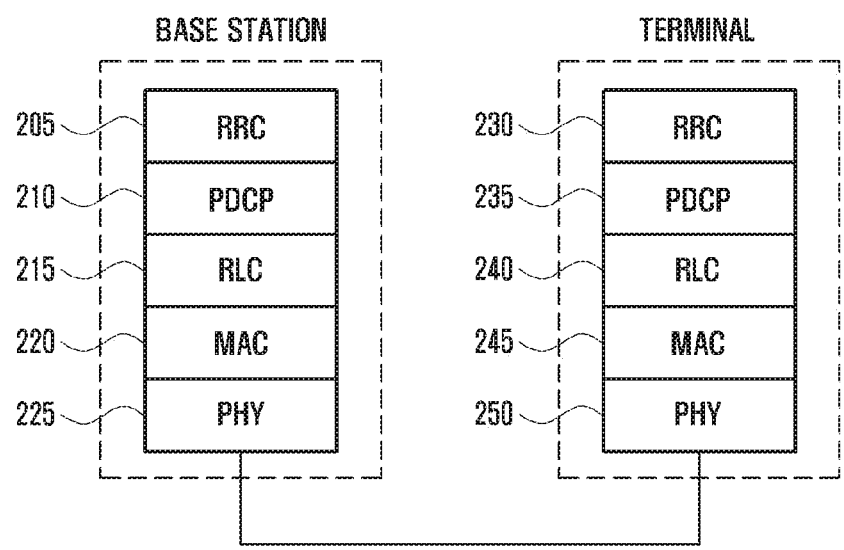
FIG. 2 is a diagram illustrating a wireless protocol structure in an LTE system.

FIG. 2 is a diagram illustrating a wireless protocol structure in an LTE system.

Referring to FIG. 2, a wireless protocol of an LTE system may be composed of a Radio Resource Control (RRC) 205 or 230, a Packet Data Convergence Protocol (PDCP) 210 or 235, a Radio Link Control (RLC) 215 or 240, a Medium Access Control (MAC) 220 or 245, and a Physical layer (PHY) 225 or 250 in each of the terminal and the base station. The RLC 205 or 230 is used to perform an access management during an initial access between the terminal and a wireless access network and to transmit/receive a system control message, such as a broadcast of system information that is transmitted to all terminals in a cell. The layer of PDCP 210 or 235 takes charge of IP header compression/decompression operation, and the layer of RLC 215 or 240 reconfigures a PDCP Packet Data Unit (PDU) with an appropriate size to perform an Automatic Repeat-reQuest (ARQ) operation.

Further, the MAC 220 or 245 is connected to several devices of RLC 215 or 240 that are configured in one terminal, and performs multiplexing/demultiplexing of RLC PDUs to/from a MAC PDU. The PHY 225 or 250 performs channel coding and modulation of upper layer data and produces OFDM symbols to transmit the OFDM symbols through a wireless channel, or performs demodulation and channel decoding of the OFDM symbols that are received through the wireless channel to transfer the demodulated and decoded OFDM symbols to an upper layer. In the case where the terminal receives data that is transmitted by the base station, the MAC 245 of the terminal generates Acknowledge (ACK) to transmit the ACK to the MAC of the base station. In the case of an RLC Acknowledge Mode (AM), an RLC ACK/Negative Acknowledge (NACK) exist between the RLC 240 of the terminal and the RLC 215 of the base station to notify of information on transmission/reception.

Figure 3:
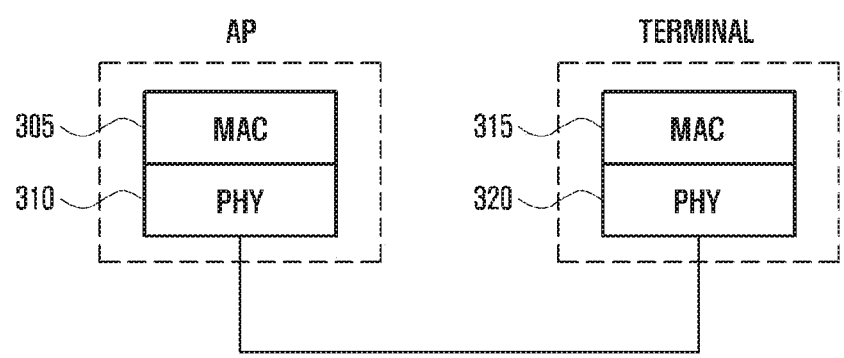
FIG. 3 is a diagram illustrating a wireless protocol structure in a wireless LAN system.

FIG. 3 is a diagram illustrating a wireless protocol structure in a wireless LAN system.

Referring to FIG. 3, according to a wireless protocol of a WIFI system, each of the terminal and the WIFI AP includes a Medium Access Control (MAC) 305 or 315 and a Physical layer (PHY) 310 or 320. The MAC 305 or 315 takes charge of scheduling and media access control, and the PHY 310 or 320 takes charge of channel coding and decoding of upper layer data. If the terminal receives data that is transmitted by the MAC 305 or 315 of the AP, a MAC ACK is generated.

Figure 4:
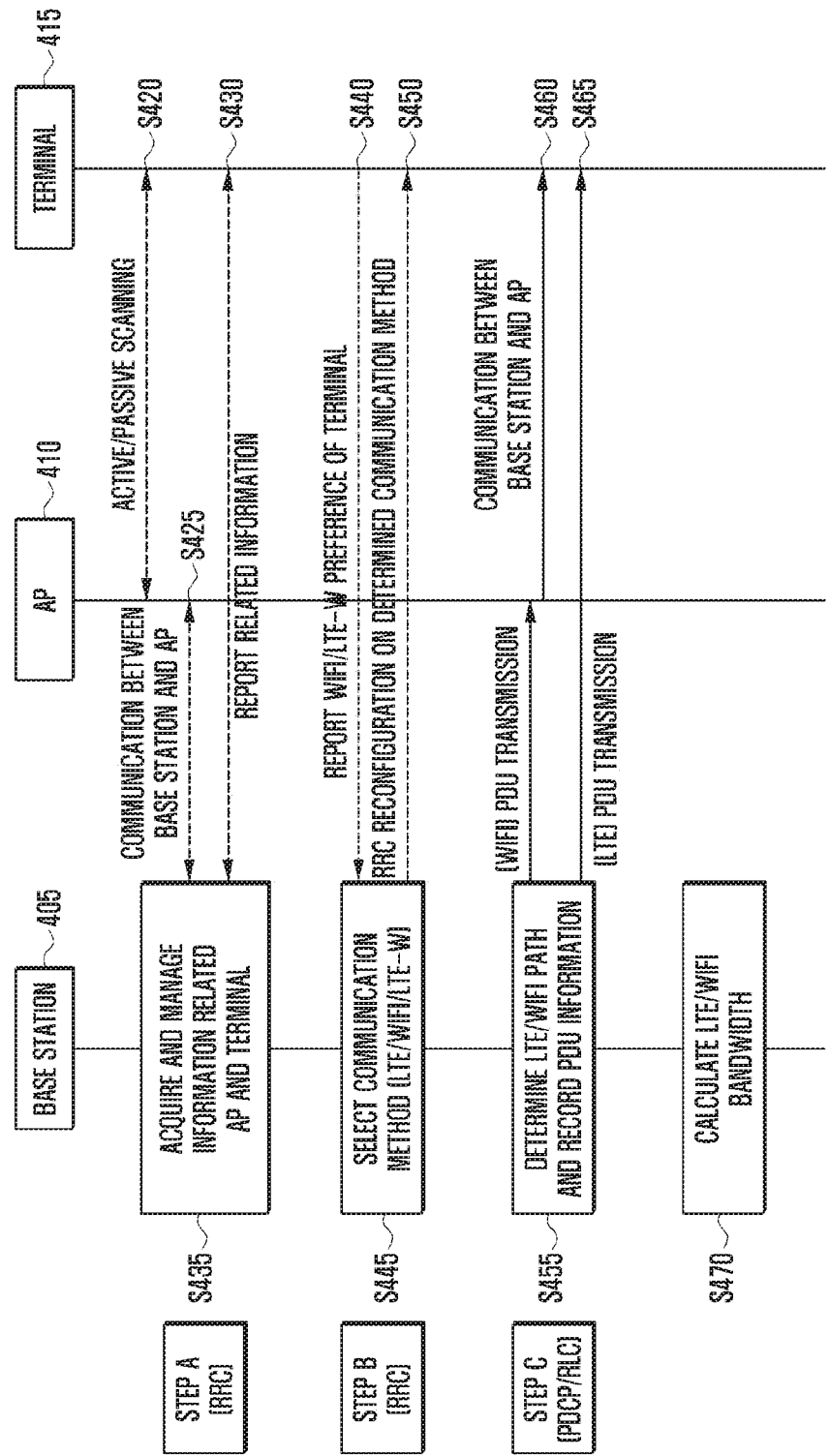
FIG. 4 is a flowchart illustrating a method for causing an LTE base station to determine and configure a communication method between a base station and a terminal according to an embodiment of the present invention.

FIG. 4 is a flowchart illustrating a method for causing an LTE base station to determine and configure a communication method between a base station and a terminal according to an embodiment of the present invention.

More specifically, referring to FIG. 4, a base station receives user preference information according to the present invention (step A). The base station determines a communication method for each bearer through reflection of the preference information (step B). Thereafter, when the base station transmits a PDU to an AP 410 and a terminal 415, it records the PDU information, and calculates a bandwidth using related information when an ACK for the PDU is received (step C).

Referring to FIG. 4, at step A, an RRC of the base station 405 receives information on the terminal 415 and the AP 410. The information on the terminal 415 and the AP 410 includes access related information. The terminal 415 receives information on the AP 410 through an active or passive scanning process with the AP 410 (S420), and transmits the information on the AP 410 to the base station 405 (S430). The base station 405 proceeds with a direct communication with the AP 410 on the basis of the information transmitted from the terminal 415, and then receives and stores the related information (S435).

At step B, if the terminal 415 transmits the user preference information on WIFI and LTE-W to the base station 405, the RRC of the base station 405 configures a communication method for each bearer using the user preference information (S445), and then transmits the result of the communication method to the terminal (S450). Transmission of the result of the communication method to the terminal includes transmission of configuration related information that is necessary for the configuration of the communication method to the terminal.

The step C relates to bearer split, and includes a process in which the base station 405 determines LTE and WIFI paths and records information of PDUs (S455) and an operation of measuring LTE and WIFI bandwidths (S470).

In the present invention, two layers of PDCP and RLC are considered as the subject of bearer split. In the case of a PDU that is transmitted through a wireless LAN system, the base station 405 transmits the PDU to the terminal 415 through the AP 410 (S460). In the case of using an LTE system, the PDU is immediately transmitted from the base station 405 to the terminal 415 (S466). Thereafter, the base station 405 calculates communication bandwidths of the two systems of LTE and WIFI on the basis of the transmitted information in response to the PDU that is received from the terminal 415 and the AP 410 (S470), and performs scheduling through reflection of the calculated bandwidth information. The information that is transmitted from the terminal 415 may include, for example, a PDCH Sequence Number (SN) of which the transmission has succeeded, and the information that is transmitted from the AP 410 may include, for example, a PDCP SN of which the transmission has succeeded, or a GPRS Tunneling Protocol—User plane tunneling (GTP-U) SN of which the transmission has succeeded.

Figure 5:
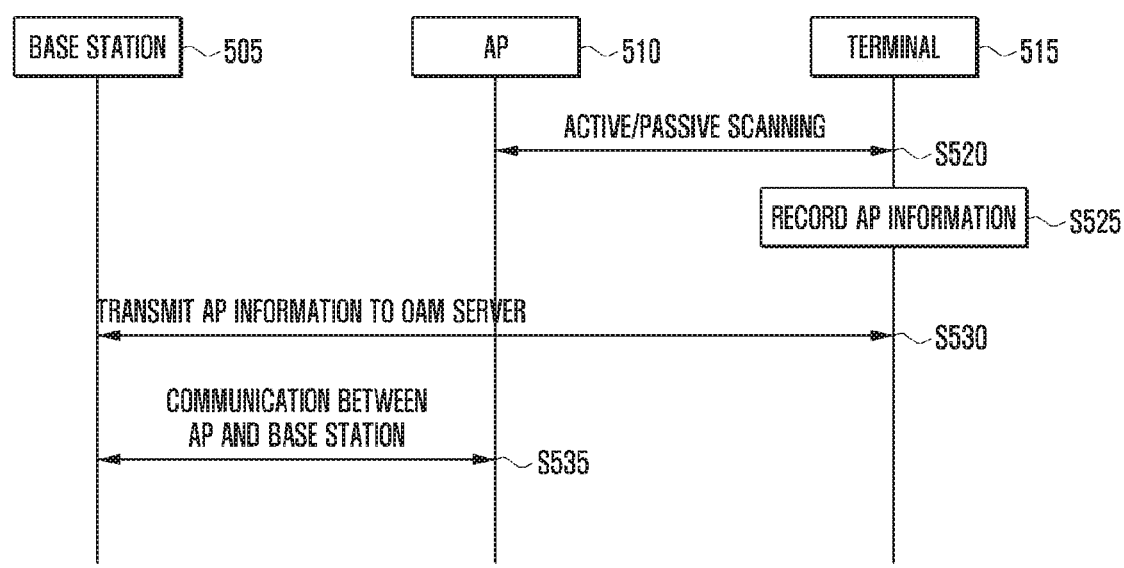
FIG. 5 is a flowchart illustrating a process of acquiring AP related information in the case where communication between an LTE base station and an access point of a wireless LAN has not been preconfigured according to an embodiment of the present invention.

FIG. 5 is a flowchart illustrating a process of acquiring AP related information in the case where communication between an LTE base station and an access point of a wireless LAN has not been preconfigured according to an embodiment of the present invention.

More specifically, FIG. 5 is a flowchart illustrating a process of acquiring access related information of an AP at step A of FIG. 4. Referring to FIG. 5, a terminal 515 that is connected to an AP 510 acquires and records related information (Service Set Identifier (SSID), Internet Protocol (IP) address, MAC address/BSSID, and capacity information) of the AP 510 to which the terminal itself is connected through an active or passive scanning process (S520) (S525). In this case, the terminal may check whether interference occurs between a channel that is used by an AP among neighboring accessible APs and a channel that is used by the terminal that is connected to a base station, and may preferentially select the AP that uses the channel having no interference. The terminal may transmit the information of the selected AP 510 to the base station 505 and an LTE network Operation, Administration, and Maintenance (OAM) server (S530). The base station 505 may confirm the information of the AP 510 that is transmitted from the terminal 515 to directly start a session through opening of the session (S535). Further, if only a part of the AP information is transferred, the base station may additionally request information for opening the session from the OAM. As described above, in addition to the above method in which the terminal directly selects the AP, the terminal may perform a method in which the terminal reports information on a signal strength and an accessible AP (i.e., the terminal that belongs to the same or equivalent PLMN has an authority to access the corresponding AP) to the base station, and the base station commands a connection to the specific AP). In this case, the base station connects the session to the corresponding AP after receiving a response message to the terminal's access command with respect to the corresponding AP. However, if an existing session for another terminal is opened, it may not be necessary to configure an additional session.

Unlike this, at step A, if communication between the AP 510 and the base station 505 have already been configured (e.g., in the case of the base station and the access point of the same network service provider), the base station 505 can immediately know a MAC address or an IP address of a neighboring AP, and thus performs communication through the existing known information. A wired network (e.g., 802.3 Ethernet) or an optical cable may be connected between the base station 505 and the AP 510, and the base station attempts an IP connection between the base station and the AP on the basis of the IP address of the AP that is obtained from the OAM server. As a transmission layer, a protocol, such as TCP or SCTP that secures reliability may be used.

Figure 6:
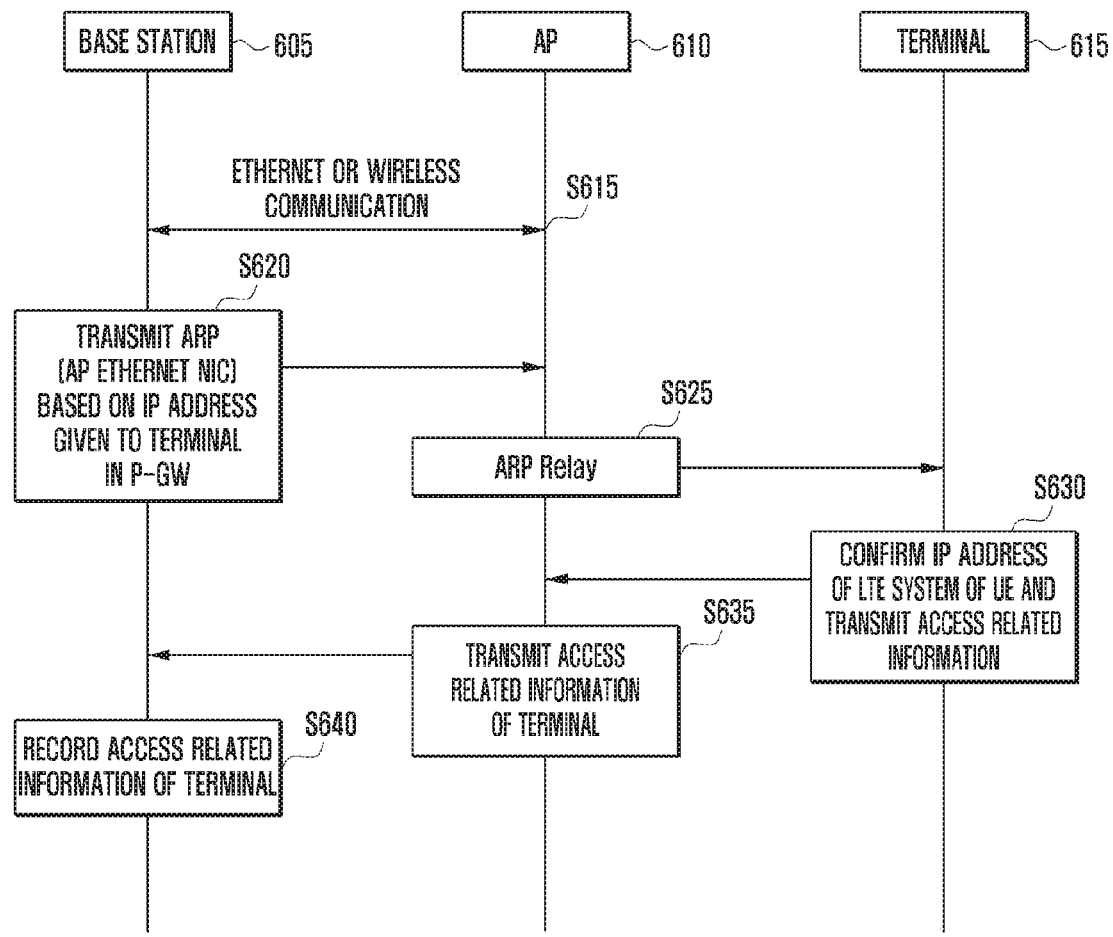
FIG. 6 is a flowchart illustrating a process in which an LTE base station receives access related information of a terminal according to an embodiment of the present invention.

FIG. 6 is a flowchart illustrating a process in which an LTE base station receives access related information of a terminal according to an embodiment of the present invention.

More specifically, FIG. 6 is a flowchart explaining a process in which the base station receives access related information from the terminal at step A of FIG. 4. Referring to FIG. 6, the base station 605 attempts communication with the AP 610 of which the address has been acquired through the process of FIG. 5 (S615). Thereafter, the base station 605 transmits an Address Resolution Protocol (ARP) on the basis of the IP address that is given from a Packet data network Gateway (P-GW) to each terminal 615 (S620). The present invention may include that the base station 605 transmits the ARP through an Ethernet Network Interface Card (NIC) of the AP 610. The AP 610 transmits the Address Resolution Protocol (ARP) to the terminal 615 (S625), and the terminal 615 confirms the IP address of the ARP. If it is confirmed that the IP address of the ARP corresponds to the IP address of the terminal itself, the terminal 615 may again transmit the access related information of the terminal 615 to the AP 610 (S630). Transmission of the access related information through the terminal 615 may include transmission of an ARP response message that includes a MAC address to the AP.

The AP 610 transfers again the information to the base station (S635), and the base station 605 records the access related information that includes the MAC address of the terminal 615 to correspond to the ID of the corresponding terminal 615 (S640). In this case, the ID is an inherent number, such as C-RNTI, International Mobile Subscriber Identity (IMSI), TMSI, Globally Unique Temporary Identifier (GUTI), or IP address, and it may be directly transmitted and acquired from the terminal 615, or may be transmitted from an HSS or OAM in the process of LTE connection and bearer generation.

The present invention may include the following embodiments in addition to the embodiment as described above with reference to FIG. 6. The present invention relates to a method in which the terminal 615 directly reports the access related information that includes the MAC address of the terminal 615 to the base station 605. When the terminal sends UE capability information in accordance with a request from the base station or voluntarily, it may send the MAC address of the terminal. Further, if the terminal 615 is in association with the base station 605, a Home Subscriber Server (HSS) or an OAM server may be directly provided with the access related information through searching for subscription information in an initial LTE connection and bearer generation process through an inherent identifier of the terminal 615, such as an IMSI or Temporary Mobile Subscriber Identity (TMSI).

The present invention may include a method in which in the case of using the AP 610, the terminal 615 may report an identifier of the AP 610, such as an SSID, Basic Service Set Identification (BSSID), to the base station 605, and the base station 605 may report MAC addresses of connected terminals that the base station 605 has directly requested from the AP 610 at the same time. Further, the present invention may include a method in which if the terminal 615 is connected to the AP 610, the AP 610 transmits a solicit message, which is based on the IP address of the terminal and which includes the MAC address of the terminal, to its overlaid base station 605, and a method in which the base station 605 confirms whether the corresponding terminal 615 is the terminal that is connected to the base station 605 with respect to the solicit message that is transmitted through a wired network, and it stores the corresponding record.

Figure 7:
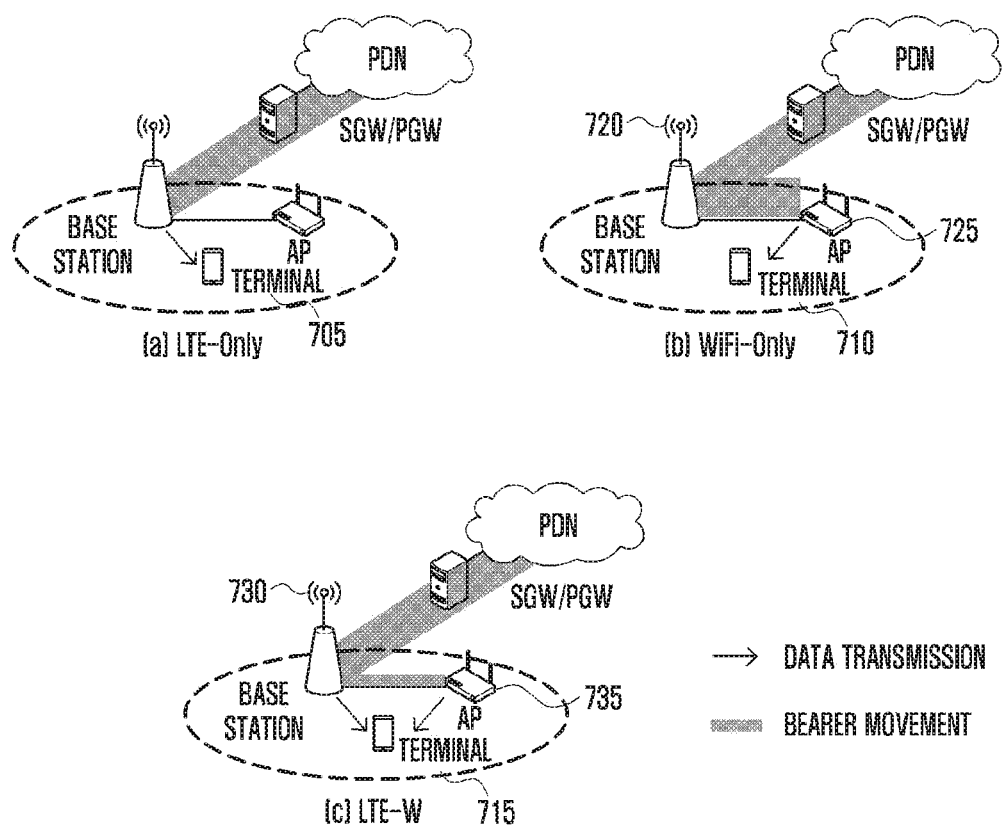
FIG. 7 is an illustrative diagram explaining a communication method between a base station and a terminal, which can be selected by the base station according to an embodiment of the present invention.

FIG. 7 is an illustrative diagram explaining a communication method between a base station and a terminal, which can be selected by the base station according to an embodiment of the present invention.

More specifically, FIG. 7 is to explain communication methods between a base station and a terminal, which can be selected by the base station at step B of FIG. 4. Referring to FIG. 7, in the process of downloading data that is requested by terminals 705, 710, and 715, a bearer is generated up to the terminals through a Packet Data Network (PDN), a P-GW, a Serving Gateway (S-GW), and the base station. The bearer is generated as a Guaranteed Bit Rate (GBR) bearer or a non-GBR bearer in accordance with the characteristics of traffic that is requested by the terminals 705, 710, and 715.

The present invention considers briefly three kinds of data transmission methods, which will be described as follows with reference to FIG. 7.

Communication method (a) LTE-Only (LTE dedicated) mode: A method for transmitting data from the LTE base station to the terminal Communication method (b) WIFI-Only (WIFI dedicated) mode: A method for transmitting data to the terminal through a WIFI AP that is connected to the LTE base station Communication method (c) LTE-W (LTE-WIFI) mode: A method for transmitting data to the terminal through the LTE base station and the WIFI AP that is connected to the base station The communication method (a) is a method for transmitting data that is received from the PDN to the base station to the terminal 705 in the same manner as the existing LTE communication method. The communication method (b) is a method for transmitting the bearer that is transmitted up to the base station 720 as it is to the terminal 710 through a wireless LAN through transmission of the transmitted bearer to the AP 725 through wired and wireless networks between the base station 720 and the AP 725.

The communication method (C) is a method for splitting the bearer that is transmitted up to the base station 730 into LTE and wireless LAN systems through an appropriate mechanism to transmit the split bearer. That is, the communication method (c) is a method for transmitting data using a carrier aggregation technology between the LTE system and the wireless LAN system. The configuration information of the bearer that is split into the LTE and wireless LAN systems may be recorded in a PDU of a PDCP or an RLC of the base station 730. The base station 730 transmits the bearer configuration information on the wireless LAN system to a wireless LAN AP. The PDU that is transmitted to the wireless LAN AP waits for in the queue of the AP 735, and then is transmitted to the terminal 715 if a prescheduled time arrives. A system in which the base station 730 splits the bearer into the LTE system and the wireless LAN system will be described in detail with reference to FIG. 10. The three kinds of communication methods as introduced above may be determined by an RRC end of the base station in consideration of the preference of the terminals 705, 710, and 715 and the total utility of the network.

Hereinafter, a billing policy for the three kinds of communication methods will be described.

Since the LTE-Only mode that is proposed in the present invention has the same communication type as the existing LTE system, a separate billing policy is not needed. However, in the case of the WIFI-Only or LTE-W mode, a freely available wireless LAN system is used, and thus a separate billing policy that is different from the billing policy of the LTE-Only mode is needed. Since the role of the existing Packet-Gateway (P-GW) is to generate flows having different QoS as different bearers and to perform billing for each bearer, the P-GW may receive a report of usage rates of the LTE and wireless LAN systems to use them in the billing process even in the WIFI-Only mode or the LTE-W mode.

As an embodiment, whenever the mode of the bearer is changed in the RRC layer of the LTE base station, it may be reported to the P-GW, and the corresponding billing data process may be separately performed in accordance with the bearer mode. If the WIFI-Only or LTE-W mode is unable to be used due to movement of the terminal from a specific time, and the mode is switched to the LTE mode, the base station notifies the P-GW of this, and thus the billing process may differ with respect to the data. As another embodiment, if a mode change occurs frequently, the load of message from the base station to the P-GW is increased, and the billing may be performed in a manner that the base station reports the usage rate of each mode for each bearer to the P-GW at predetermined intervals, or it estimates an average usage rate on the basis of accumulated information and reports the estimated average usage rate to the P-GW. Further, the bearer has the concept of several combined flows, and if it is intended to independently use only a specific flow in a specific mode, a method in which the P-GW generates the flow as an individual bearer may be used. For example, in the case of a specific application, data reception time is not important, and in order to receive the data only in the WIFI-Only mode when the WIFI is available, the bearer for the corresponding flow may be split and generated. Accordingly, the base station should always operate in the WIFI-Only mode with respect to the corresponding bearer, and if an available AP for the WIFI usage does not exist over a predetermined time, the terminal may guide the P-GW to release the corresponding bearer or to change the mode to another mode.

Figure 8:
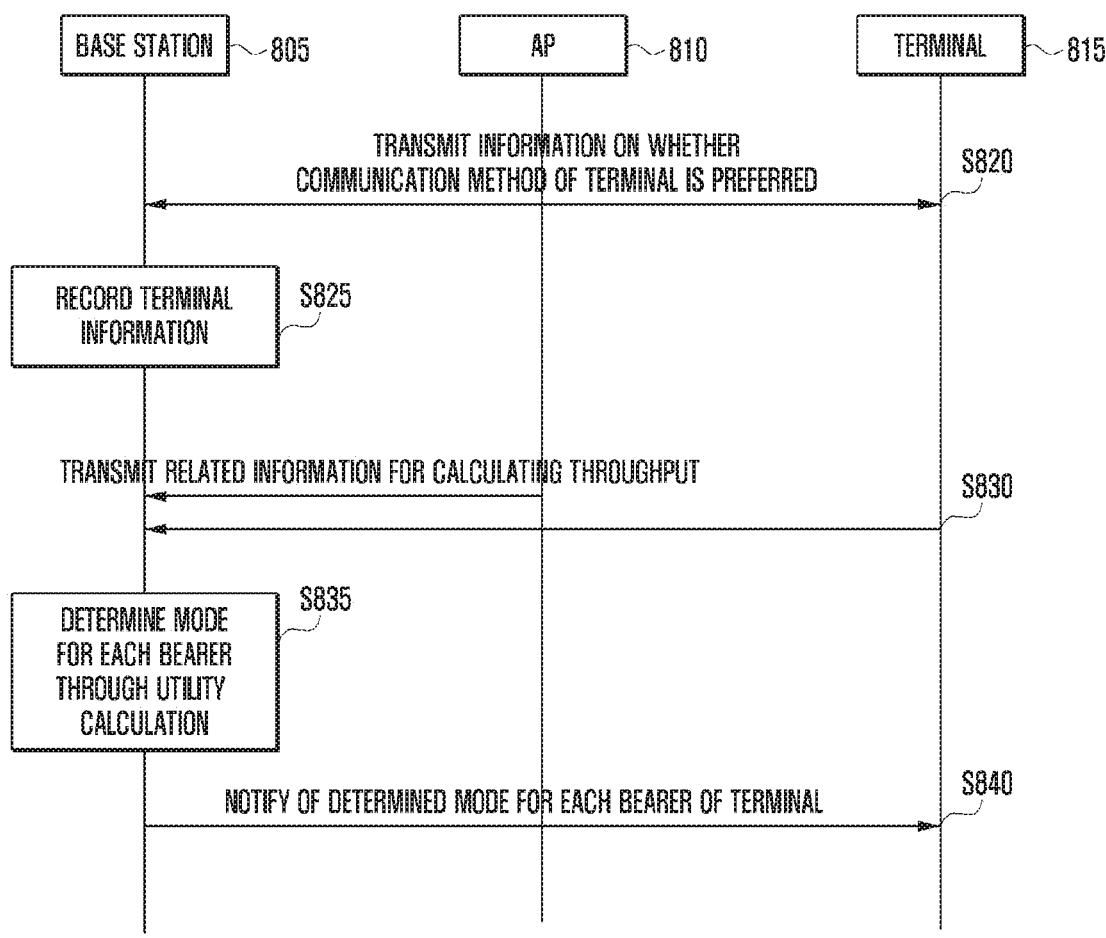
FIG. 8 is a diagram illustrating a process of receiving determination related information from a terminal and an access point of a wireless LAN in order for an LTE base station to determine a communication method for each bearer according to an embodiment of the present invention.

FIG. 8 is a diagram illustrating a process of receiving determination related information from a terminal and an access point of a wireless LAN in order for an LTE base station to determine a communication method for each bearer according to an embodiment of the present invention.

Referring to FIG. 8, a terminal 815 may transmit prior information on the preference of a communication method with a base station 805 to the base station 805 through, for example, a Radio Resource Control (RRC) message (S820). The terminal 815 may perform an authentication process with the base station 805 before transmitting the information to the base station 805. The base station 805 may store preference information of a user of the terminal 815 and related information (S825). Further, the base station 805 may receive related information that is necessary to select the communication method of each bearer from an AP 810 and the terminal 815 (S830). The related information that is necessary to select the communication method of each bearer may include a utility value of a network of each system. Further, information that is necessary to calculate the utility value of the network may include throughput (data throughput per unit time) in each system. The base station may determine the communication method for each bearer of each terminal on the basis of the related information (S835).

Table 1 below shows a process of selecting a communication method of the base station 805 in accordance with the preference of the terminal 815.

TABLE 1

|  |  | LTE-W mode | |
|---|---|---|---|
|  |  | Yes (1) | No (0) |
| WiFi-Only mode | Yes (1) | WiFi-Only | WiFi-Only |
|  | No (0) | LTE-W > LTE-Only | LTE-Only |

The base station 805 preferentially assigns a WIFI-Only communication method and an LTE-Only communication method. If the terminal 815 preferentially selects WIFI, the base station 805 may determine the communication method of each bearer that is generated up to each terminal 815 in a WIFI-Only mode in deference to the preference of the terminal 815. Further, if the terminal 815 does not prefer to the WIFI-Only mode and does not prefer to the LTE-W mode as well, the base station may determine the bearer generated up to the terminal 815 in the LTE-Only mode. However, if the terminal 815 does not prefer to the WIFI-Only, but prefers to the LTE-W, the base station may determine the bearer in the LTE-W or LTE-Only mode, and the determination process thereof is as follows.

1. With respect to all bearers of the terminal that prefers to the LTE-W mode, increment values of the total network utility values are calculated in the case where the communication method of each bearer is determined in the LTE-Only mode and in the LTE-W mode.

2. The bearer having the largest utility increment is selected in the LTE-W mode.

As the above-described process is repeated, the LTE-W mode is selected, the bearers having the maximum utility increment are successively determined in the LTE-W mode, and the above-described process is repeated until the utility of the network is not increased any more due to the LTE-W mode. The utility may be calculated using Equation 1 below.

$$U(t) = \begin{cases} \dfrac{t^{1-\alpha}}{1-\alpha} & \alpha > 0, \alpha \neq 1 \\ \log t & \alpha = 1 \end{cases} \quad [\text{Equation 1}]$$

t: Throughput per unit time

Since the base station 805 calculates the utility of the whole network on the basis of throughput of each bearer, a process of continuously receiving the transmitted throughput information is needed (S830). Various embodiments exist in performing the method.

First, the base station 805 takes charge of bearer split through recording of information on the respective PDUs, and using the information, the base station 805 can directly calculate the throughput in the LTE base station and the WIFI AP. In another embodiment, the AP 810 may transmit average throughput information of each queue to the base station 805, and in this case, a list that includes MAC address, DRB ID, and average throughput information is transmitted through a backhaul periodically or when a specific event (e.g., the terminal 815 secedes from the WIFI network and is disconnected from the AP 810) occurs. The base station 805 may store the WIFI throughput of the bearer that corresponds to the MACX address and the DRB ID on the basis of the received information, and may obtain the total capacity of the AP 810 through summing of the total throughput.

In the case of the bearer that is first generated, the existing throughput information does not exist, and an average throughput value that is calculated in the previous AP 810 and the base station 805 is used. In particular, in the case of a wireless LAN system, the average throughput (=capacity/queue number) can be estimated through the number of queues that indicates the total sum of the bearer that is currently being serviced and a background station.

After determining the communication method for each bearer through the above-described process, the communication method for each bearer that is determined in the terminal is reported (S840). Since the LTE-Only mode and the WIFI-Only mode are immediately determined by the preference of the terminal, the base station 895 may determine whether the terminal 815 corresponds to the LTE-W, and may contain and transmit the ID of the terminal 815, bearer ID, and information on whether the terminal corresponds to the LTE-W (0/1). In this case, the ID of the terminal 815 may include shared numbers, such as C-RNTI, an IP address of the terminal 815, and IMSI. In contrast, if the communication method is determined in the LTE-W mode, a bearer split process should be additionally performed to the LTE system and the WIFI system, and the bearer split configuration information should be transmitted to the terminal. The additional operation of the base station in the LTE-W mode will be described in more detail with reference to FIGS. 10 and 16.

As described above, since the mode that is once determined may be changed in accordance with the environment of the terminal or the throughput for each bearer, the base station may periodically determined the mode. In particular, if the terminal 815 does not want to use the WIFI communication method due to deterioration of the WIFI signal strength or movement of the terminal 815, the terminal 815 may change the WIFI-Only signal. If the information that is changed by the terminal 815 is transferred to the base station 805, the base station 805 changes the communication method of the terminal 815 to the LTE-W or LTE-Only mode in consideration of this.

In addition to the method in which the terminal 815 directly requests the mode change from the base station 805, the AP 810 may indirectly determine the situation and notify the base station 805 of the determined situation. If the terminal 815 secedes from the communication radius of the AP of the wireless LAN and ARP transmission/reception between the AP 810 and the terminal 815 is not performed, or if the AP does not receive a MAC layer ACK from the terminal 815 after transmitting data to the terminal 815, the AP 810 determines that the terminal 815 has seceded from the communication radius of the AP of the wireless LAN, and may transmit error occurrence in the communication with the terminal 815 to the base station 805 through containing of C-RNTI (8 bits) and DRB ID (4 bits) information.

As another embodiment, the base station 805 may indirectly sense a connection change between the terminal 815 and the AP 810. If the measurement Round Trip Time (RTT) of the wireless LAN system is abruptly increased to be greater than a Packet Data Budget (PDB) of the bearer or a Packet Error Loss Rate (PELR) permitted by the bearer, the base station 805 may sense the connection change between the terminal 815 and the AP 810. If the base station 805 determines that the communication state between the terminal 815 and the AP 810 is not good, it may change the communication method of the terminal 815 through reflection thereof.

Figure 9:
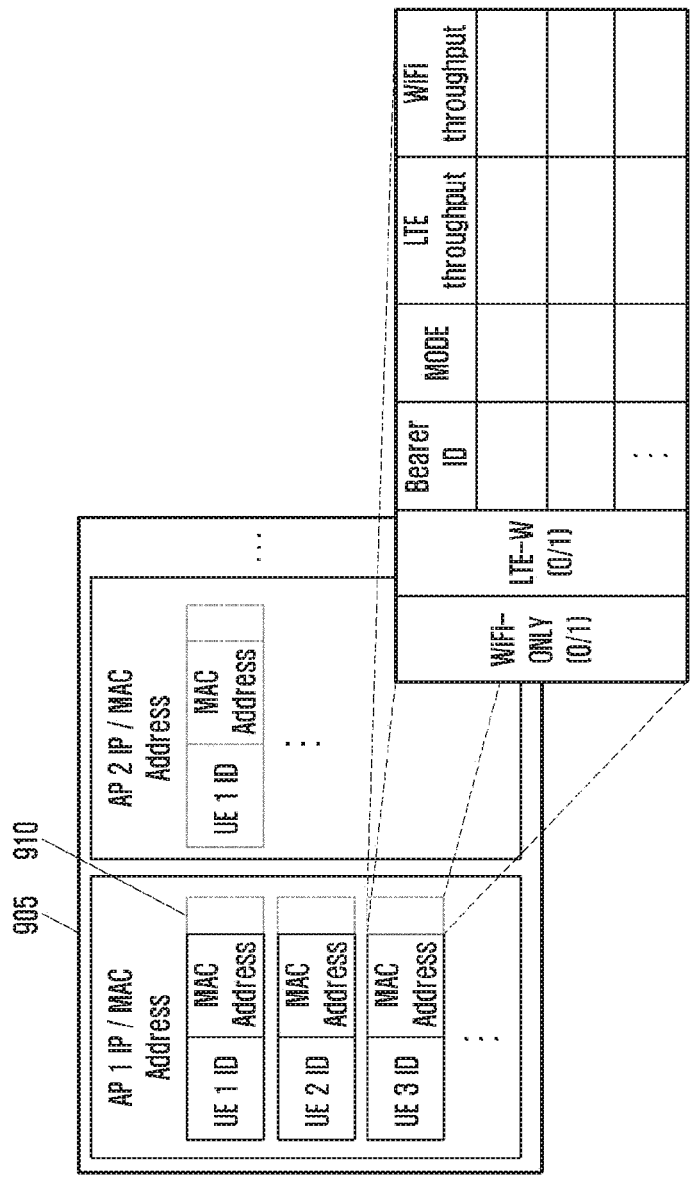
FIG. 9 is a diagram explaining information that is used for an LTE base station to select a communication method between a base station and a terminal according to an embodiment of the present invention.

FIG. 9 is a diagram explaining information that is used for an LTE base station to select a communication method between a base station and a terminal according to an embodiment of the present invention.

More specifically, FIG. 8 is a diagram exemplifying the configuration of information that is considered when the LTE base station determines the communication method between the base station and the terminal. Referring to FIG. 9, the base station may store IP/MAC addresses for each AP, capacity, the number of queues generated in the AP (total sum of bearers that are currently being serviced by the AP and background terminals), and information of terminals connected to respective APs (905). The terminal information 910 may include a terminal ID (inherent number, such as IMSI, S-TMSI, GUTI, and IP address), a MAC address for WIFI communication, communication method preference information, bearer ID that is being serviced in each terminal, a communication method for each bearer, and corresponding throughput. If the bearer is in the LTE-Only mode, the throughput of the bearer becomes the throughput in the LTE system, and if the bearer is in the WIFI-Only mode, the bearer throughput becomes the throughput in the WIFI system. In the case of the LTE-W, the sum of the LTE throughput and the WIFI throughput becomes the bearer throughput. The communication method of each bearer is determined through WIFI and LTE-W preferences and throughput among information 910 of each terminal. The information that is explained in FIG. 9 corresponds to an example of information that is necessary for the base station to determine and manage the communication method between the terminals, and the configuration that is necessary to achieve the purpose of the present invention may be further included in the information.

Figure 10A:
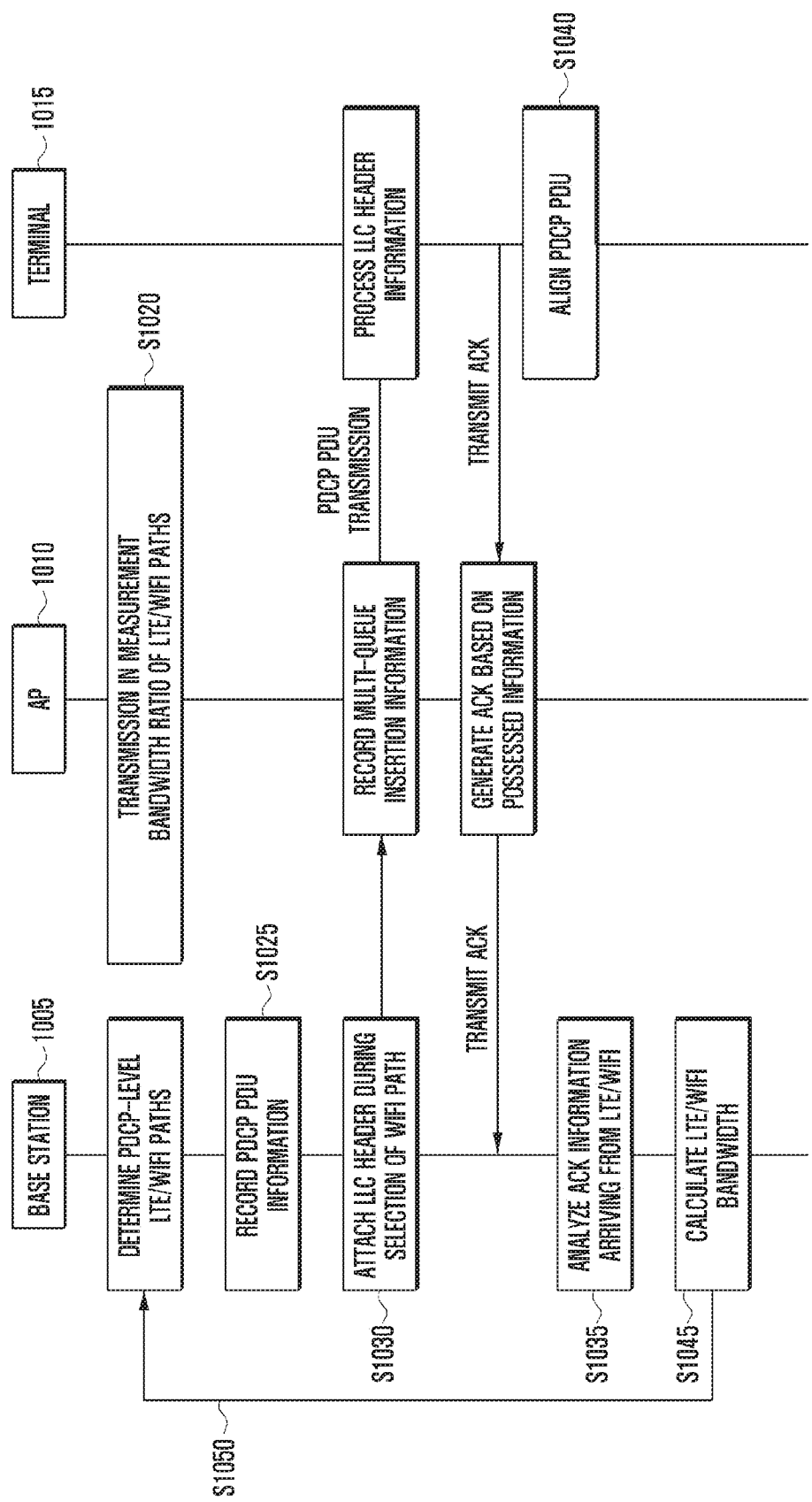
FIGS. 10A and 10B are diagrams materializing a portion of step C that corresponds to FIG. 4 according to an embodiment of the present invention.
Figure 10B:
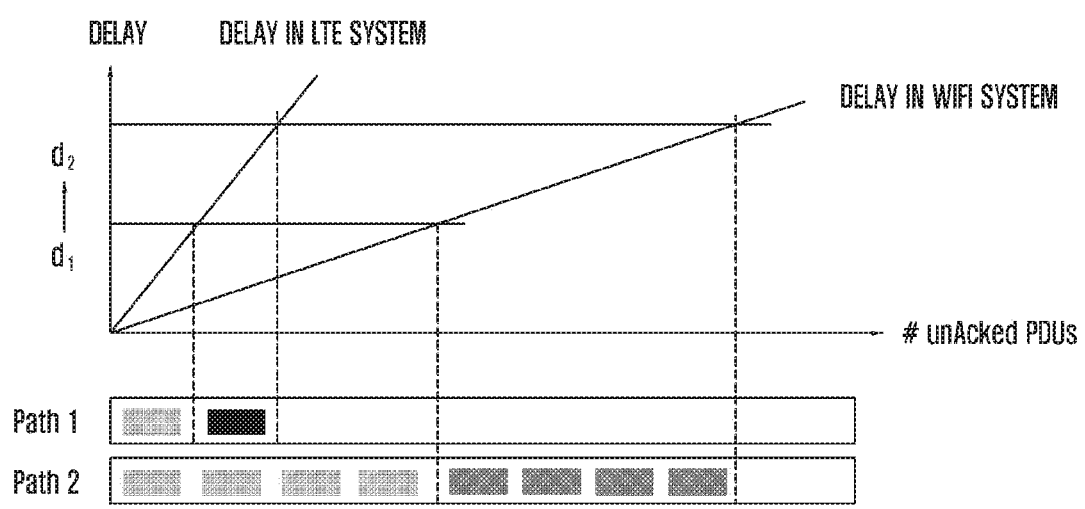

FIGS. 10A and 10B are diagrams materializing a portion of step C that corresponds to FIG. 4 according to an embodiment of the present invention.

More specifically, FIG. 10A is a diagram illustrating a bearer split process from the PDCP level of a base station to an LTE system and a WIFI system if the base station configures a communication method between terminals in an LTE-W mode. In order to maximally use the bandwidths in the LTE system and the WIFI system, the base station may split the bearer into a bearer for transmitting data from the LTE base station to the terminal and a bearer for transmitting data from the WIFI AP to the terminal. This is to prevent any one of LTE and WIFI paths in the LTE-W mode from being excessively used or from being surplus.

Referring to FIG. 10, a base station 1005 may determine a path through which data is sent to an LTE system or a WIFI system, and may transmit data in the ratio of measurement bandwidths of LTE/WIFI paths (S1020). The base station 1005 may confirm a delay of the LTE/WIFI paths and may perform scheduling of the PDCP as the path having a shorter delay. The scheduling of the PDCP means that the bearer split is performed on the basis of the determined result, and configuration information for the bearer split is determined. In this case, the delay may be estimated through the bandwidths of both paths and the number of unacknowledged (unacked) PDUs. The unacked PDUs may mean the number of previous PDCP PDUs that have not yet been acknowledged (acked) at a time when a specific PDCP PDU is sent. In the present invention, modeling of the delay may be derived using Equation 2 below.

$$\text{Delay}=1/\text{bandwidth} \square(\text{the number of unacked PDCP PDUs})+\text{propagation delay} \qquad [\text{Equation 2}]$$

FIG. 10B illustrates an example of path determination of PDCP PDU to be transmitted to the LTE or WIFI system. In the case of transmitting one PDCP PDU in the path of the LTE system, 4 PDCP PDUs are transmitted to the path of the WIFI system to match the delay against the path of the WIFI system. If it is determined to distribute more PDCP PDUs to a place having a smaller delay in a state where the number of PDCP PDUs to be transmitted to each system is determined, similar delay can be maintained through the two paths, and thus the bearers are distributed and used in the ratio of bandwidths in the two systems. Accordingly, since the possibility that the PDCP PDUs that arrive through the two paths become in the mixed order is reduced, the PDCP reception performance in the terminal can be improved, and the performance deterioration due to the delay of the PDCP re-ordering can be reduced during the protocol operation of an upper layer, such as TCP. The base station 1005 may record information on the bearer determination in the PDCP PDU just before the transmission of the PDCP PDU after determining the path of the PDCP PDU to be transmitted to the LTE or WIFI system (S1025).

Figure 11:
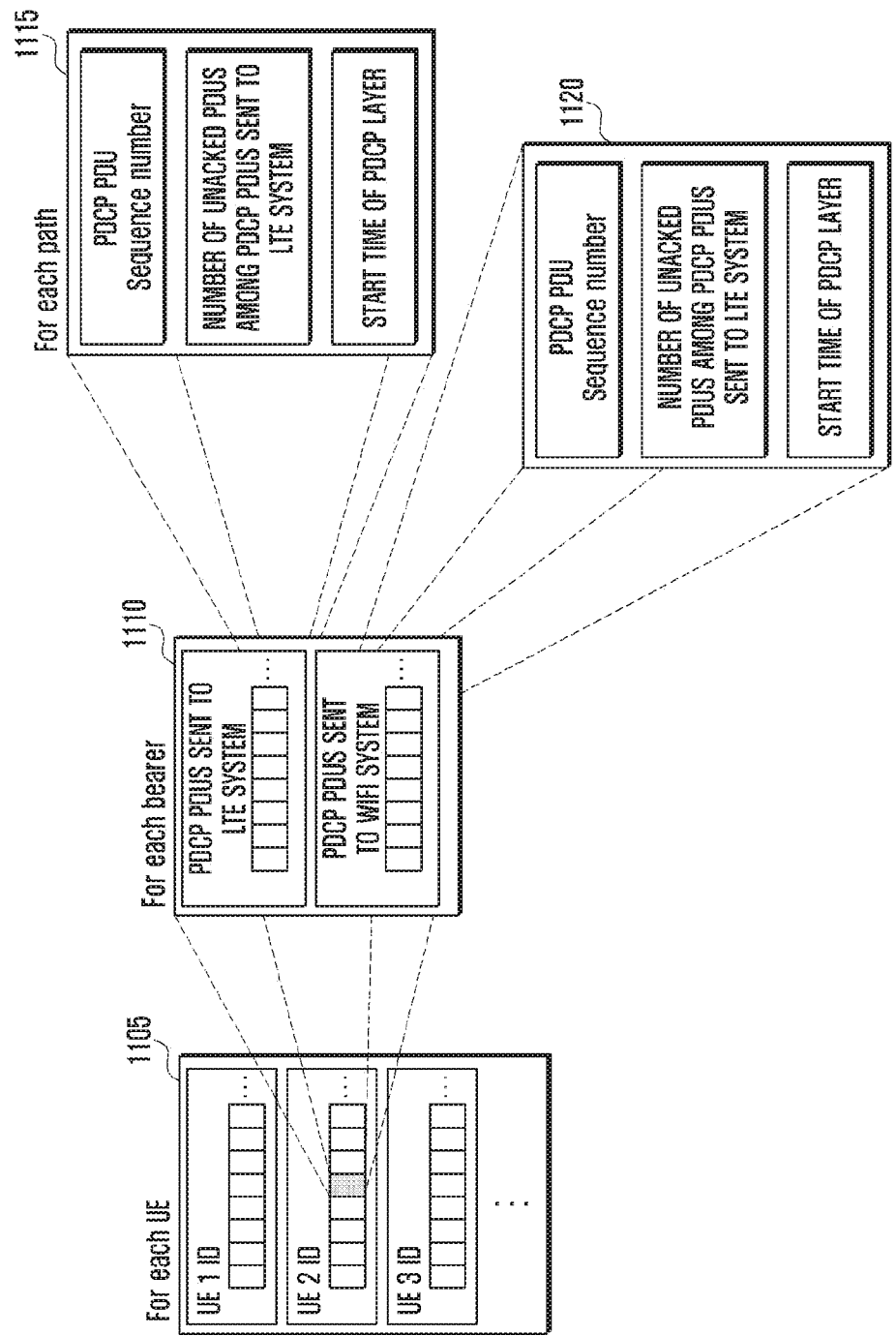
FIG. 11 is a diagram exemplifying information that is recorded in a Packet Data Convergence Protocol (PDCP) Packet Data Unit (PDU) of a base station according to an embodiment of the present invention.

FIG. 11 is a diagram exemplifying information that is recorded in a PDCP PDU of a base station according to an embodiment of the present invention.

Referring to FIG. 11, in order to simultaneously use and to perform scheduling of an LTE system and a WIFI system, information to be stored at a PDCP end of a base station is indicated. The base station stores information on a terminal that performs LTE-W among all terminals connected to the base station (1105). With respect to each bearer that is determined as a communication method of LTE-W (1110), the terminal records the PDCP SN of PDCP PDU to be transmitted to two systems of LTE and WIFI, the number of unacked PDUs, and PDCP start time of a specific PDCP PDU (1115 and 1120).

In the case of transmitting a PDCP PDU using the path of the LTE system, information may be recorded in the PDCP PDU like the existing LTE system, whereas in the case where the PDCP PDU is transmitted to a terminal 1015 through an AP 1010 through the WIFI system, additional processes, such as attachment of a Logical Link Control (LLC) header to the PDCP PDU, are necessary (S1030). The detailed process will be described with reference to FIGS. 12 and 13.

Thereafter, ACK information indicating whether the PDCP PDU has been transmitted to paths of the LTE and WIFI systems may be transmitted from the terminal or the AP 1010. The information that is transmitted from the terminal 1015 may include, for example, a PDCP Sequence Number (SN) of which the reception has succeeded, and information that is transmitted from the AP 1010 may include, for example, a PDCP SN of which the transmission has succeeded or a GPRS Tunneling Protocol—User plane tunneling (GTP-U) SN of which the transmission has succeeded.

The base station 1005 may analyze the received ACK information (S1035), calculate bandwidths of the LTE and WIFI paths using the recorded information (S1045), and determine the path of the PDCP PDU to be transmitted again to the LTE or WIFI system through reflection of the calculated bandwidths (S1045). Since the terminal 1015 receives the PDCP PDU that is transmitted through the paths of the LTE and WIFI systems, a buffer is provided to receive the transmitted PDCP PDU to cope with a case where a delay differs, and the terminal performs alignment before transmitting the PDCP PDU to an upper layer (S1040). The alignment process of the terminal will be described in detail with reference to FIG. 15. The explanation with reference to FIG. 10 corresponds to an embodiment of the present invention, and the path determination in the base station, recording for transmission of the determined information to the terminal, and the processing of the PDCP PDU can be processed through another operating system, and the present invention may include this. Further, the transmission of the PDCP PDU to the terminal and the AP includes configuration of a carrier of the LTE base station or the wireless LAN AP into the terminal.

Figure 12A:
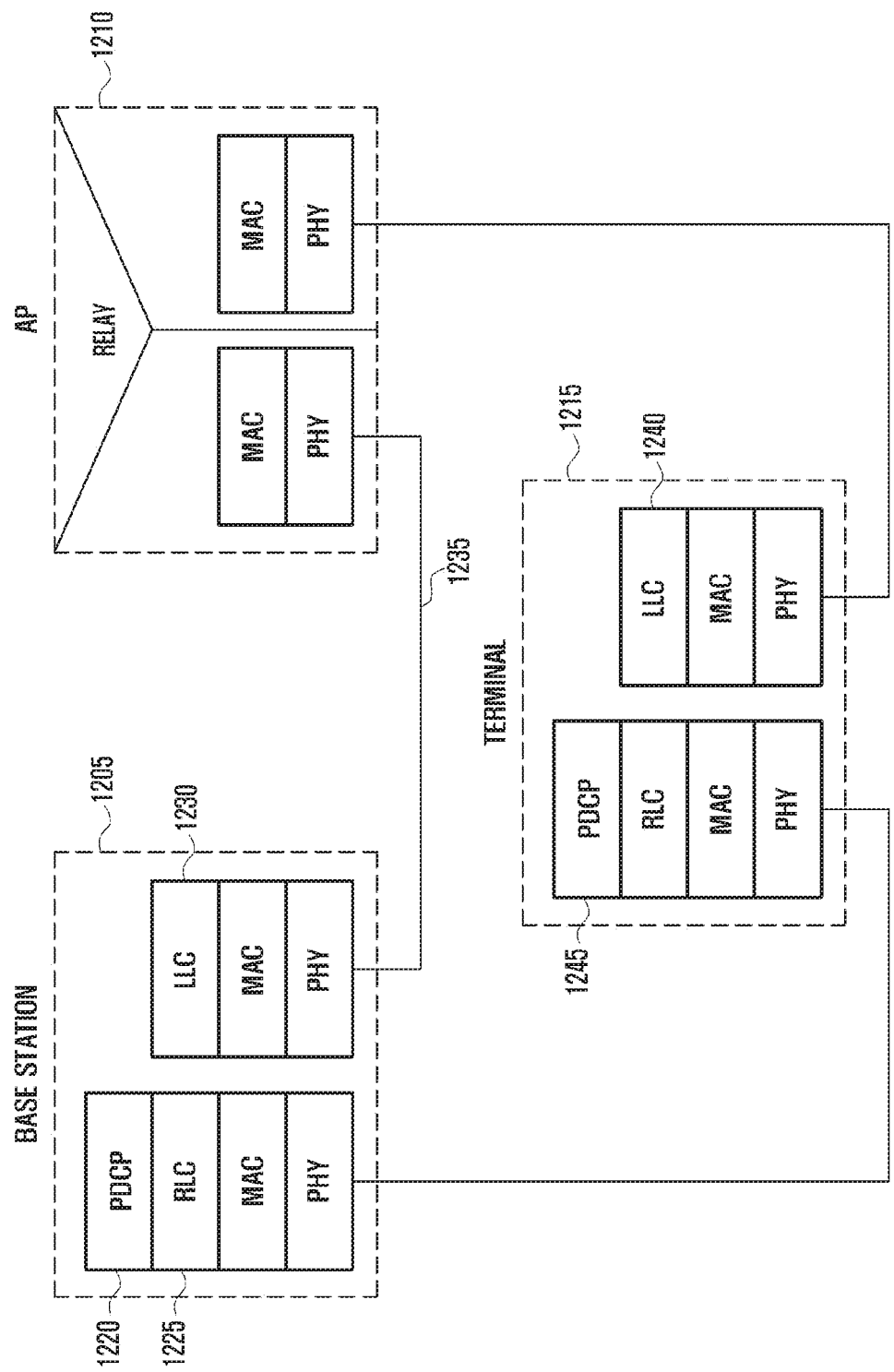
FIGS. 12A and 12B are diagrams illustrating a protocol structure that coexists between an LTE system and a wireless LAN system if a bearer is split at a Packet Data Convergence Protocol (PDCP) end of an LTE base station according to an embodiment of the present invention.
Figure 12B:
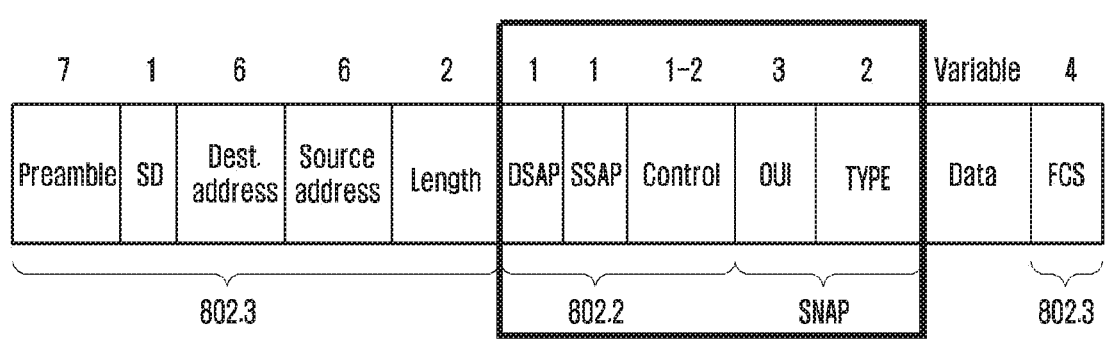

FIGS. 12A and 12B are diagrams illustrating a protocol structure that coexists between an LTE system and a wireless LAN system if a bearer is split at a Packet Data Convergence Protocol (PDCP) end of an LTE base station according to an embodiment of the present invention.

Referring to FIG. 12A, a PDCP end of a base station 1205 performs split of a bearer to be transmitted to an LTE system and a WIFI system. The base station PDCP 1220 determines scheduling to the LTE system or the WIFI system, and transmits the PDCP PDU to an RLC 1225 of the LTE system or an LLC 1230 of the WIFI system. That is, in the case of transmitting the PDCP PDU to the LTE system, the PDCP PDU is transmitted in the same manner as the communication method of the existing LTE system, whereas in the case of transmitting the PDCP PDU to the WIFI system, a Logical Link Control (LLC) header that contains an inherent number that is given to the PDCP is attached to the PDCP to be transmitted to the AP (1235). The transmission to the AP may be performed using 802.3 Ethernet or wireless network.

FIG. 12B is a diagram illustrating a protocol of the LLC header.

The LLC corresponds to 802.2 technology, and provides an interface that is common to an upper end, such as 802.x MAC, Internet Protocol version 4 (IPv4), or IPv6. Further, 802.2 Subnetwork Access Protocol (SNAP) technology having an extended 802.2 header can discriminate 65536 (2 byte) kinds of upper layer protocols so that the LLC can use various upper network layers.

Among 65536 protocols, 0x0800 indicates IPv4, 0x0806 indicates ARP, and 0x0000-0x05DC (0~1500) is used as a value that indicates the length. In the present invention, using 0~1024 (10 bits) among 0~1500, 2 bits of 10 bits may be used to indicate that an upper layer corresponds to the PDCP, and 8 bits thereof may be used to record an inherent ID C-RNTI value that indicates the terminal.

Further, a Data Bearer ID (DRB) and a PDCP Sequence Number (SN) are written temporarily using an Organization Unique Identifier (OUI) field until the base station PDCP 1220 receives the AP 1210. At present, a NULL value is fixedly written in the OUI, and thus there is room for correction and usage of the OUI. Since the OUI field is composed of 3 bytes (24 bits), 4 bits thereof may be used to specify a DRB ID, and 12 bits thereof may be used to specify a PDCP SN.

If it is difficult to use the OUI field, the AP may confirm the PDCP SN and the DRB ID in the following method. First, the AP 1210 can confirm the specified PDCP SN and DRB ID through direct confirmation of the PDCP header. Further, after the paths to the LTE system and the WIFI system are determined, an LLC header 1230 is attached to the PDCP PDU, and then a separate header in which separate PDCP SN and DRB ID are written (total 16 bits) is mounted on the PDCP PDU to be transmitted. The AP 1210 receives the PDCP PDU, confirms and removes the mounted separate header, and then transmits the PDCP PDU to the terminal that is determined in the LTE-W mode.

As described above, in the case where the base station transmits the determined PDCP PDU to the path of the WIFI system, it is necessary to add the PDCP SN and DRB ID information to the PDCP PDU to be transmitted, and in this case, a destination address may be the AP 1210 or the terminal 1215. That is, in the case where the AP 1210 serves as a connection bridge only, the destination may be the terminal 1215, and it is not necessary for the AP 1210 to manage a UE MAC address separately. In contrast, in the case where the AP 1210 serves as a switch, the destination may be the MAC address of the AP 1210. Further, if it is assumed that additional information is prescribed in the PDCP PDU through the LLC header, the base station may additionally record the ID of the terminal 1215 that is managed by the base station in the LLC header to be transmitted. In this case, the AP 1210 should manage a list of the ID of the terminal 1215 (e.g., it may include inherent numbers, such as an IP address, IMSI, and C-RNTI) and a terminal MAC address. During the reception of the PDCP PDU, the AP 1210 may confirm the ID of the destination terminal 1215, search for the corresponding proper terminal MAC address from the list, and write the terminal MAC address in the PDCP PDU to be transmitted.

If the terminal 1215 receives the transmitted PDCP PDU through the WIFI system, it confirms the PDCP inherent number that is written in the LLC header (1240), and moves the PDCP PDU to the PDCP 1245. If the order is correct, the terminal 1215 immediately transmits the PDCP PDU to an upper layer, whereas if the order is not correct, the terminal 1215 temporarily stores the PDCP PDU in a buffer, corrects the order through waiting for the PDCP PDU in the LTE path, and transmits the PDCP PDU to the upper layer.

Figure 13A:
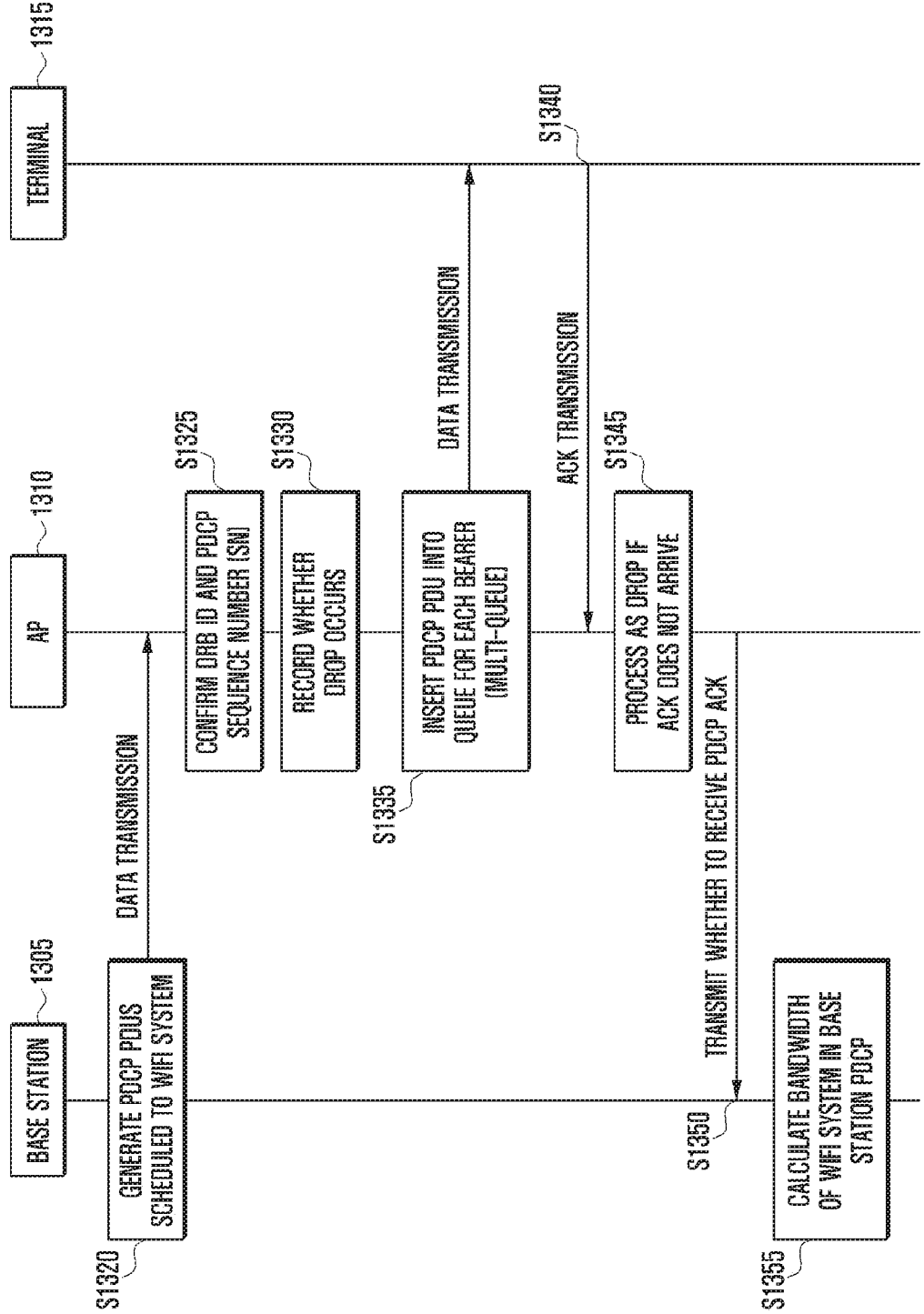
FIGS. 13A and 13B are diagrams illustrating a process of transmitting data and information among a base station, an access point, and a terminal according to an embodiment of the present invention.
Figure 13B:
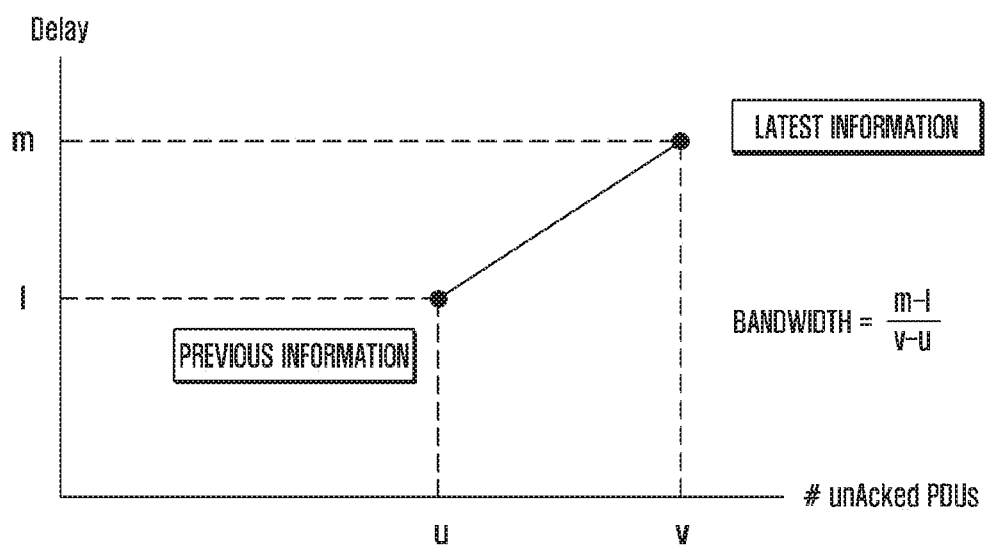

FIGS. 13A and 13B are diagrams illustrating a process of transmitting data and information among a base station, an access point, and a terminal according to an embodiment of the present invention.

Referring to FIG. 13A, after the path is determined from a PDCP layer of a base station 1305 to a WIFI system, the PDCP PDU that is generated from the base station is transmitted to an AP through an Ethernet (S1320). The AP 1310 confirms the DRB ID and the PDCP SN using an LLC header of the received PDCP PDU (S1325). However, the AP 1310 does not have an infinite buffer size, and if many devices are connected to the AP 1310 or a large amount of data is stored in the AP, the AP cannot perfectly receive the PDCP PDU to be dropped. If the drop occurs, it means that the PDCP PDU is not normally transmitted, and the AP 1310 records the drop with respect to the corresponding PDCP PDU (S1330). Information that is recorded in the AP 1310 will be described in detail with reference to FIG. 14.

In the present invention, the AP 1310 generates different queues by bearers or by background stations to form a multi-queue system. After confirming the DRB ID of the PDCP PDU (S1325), the AP 1310 stores the corresponding PDU in the previously generated queue, and in the case of a newly generated bearer, it generates a queue to store the PDCP PDU (S1335). In the queue for each bearer, if a MAC transmission opportunity is given to the terminal, the PDCP PDU at that time is transmitted to the corresponding terminal 1315. After the data transmission is completed, the MAC end of the terminal 1315 transmits an ACK message to an AP MAC end (S1340). If the ACK is not received from the terminal 1315 due to an environmental influence of the wireless LAN, the AP 1310 determines that the corresponding PDU is dropped, and processes the corresponding PDU as a drop in information for each bearer that is owned by the AP (S1345).

The AP 1310 transmits the ACK information that is received by the AP MAC to the PDCP of the base station 1305 through communication between the AP 1310 and the base station 1305 (S1350), and the PDCP of the base station 1305 calculates time in which the PDCP PDU is transmitted from the base station 1305 to the terminal 1315 and the ACK information is transmitted again to the base station 1305 through the AP 1310, and uses the calculated time as information for calculating the WIFI bandwidth (S1355).

FIG. 13B is a diagram explaining a method in which a base station 1305 calculates a bandwidth of a WIFI system at operation S1355.

Information on two PDCP PDUs (the number of unacked PDUs and delay) that are recently received may be presented on a 2D plane as (u,l) and (v,m). In this case, the number of unacked PDUs is based on the information that is recorded in the base station, and the delay may be time measured from the start time that is recorded in the base station when the PDCP PDU starts to the time when the ACK message that is received from both paths of the LTE and WIFI systems arrives. Since a slope of a straight line that is connected between two PDCP PDUs represents the bandwidth, the bandwidth can be arithmetically obtained from information of two points, that is, $$\text{bandwidth} = \frac{m-l}{v-u}.$$

The bandwidth that is acquired from the information of each path is updated through an exponential moving average (e.g., Bandwidth=1/512□new bandwidth+(1−1/512)□old bandwidth).

Figure 14:
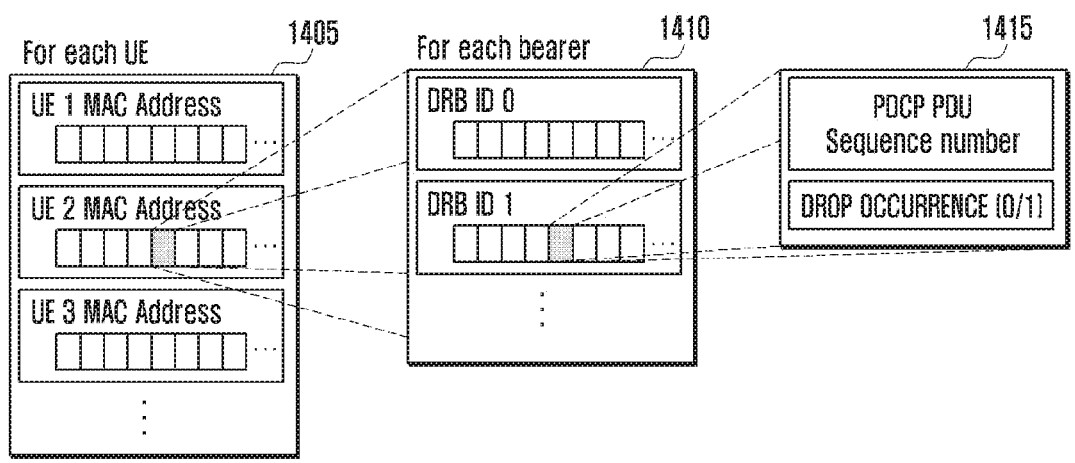
FIG. 14 is a diagram illustrating an information storage structure for neighboring terminals managed by an access point according to an embodiment of the present invention.

FIG. 14 is a diagram illustrating an information storage structure for neighboring terminals managed by an access point according to an embodiment of the present invention.

Referring to FIG. 14, an AP records a MAC address and information of a terminal that uses LTE-W (1405). The AP records bearer information 1410 that is generated by each terminal, a PDCP PDU SN that corresponds to each bearer, and existence or absence of a drop (S1415). The corresponding information has already been explained with reference to FIGS. 13A and 13B, and the information is corrected whenever the information is updated. The recorded information is used when related information is transmitted to the base station after the reception of the AP MAC ACK.

Figure 15:
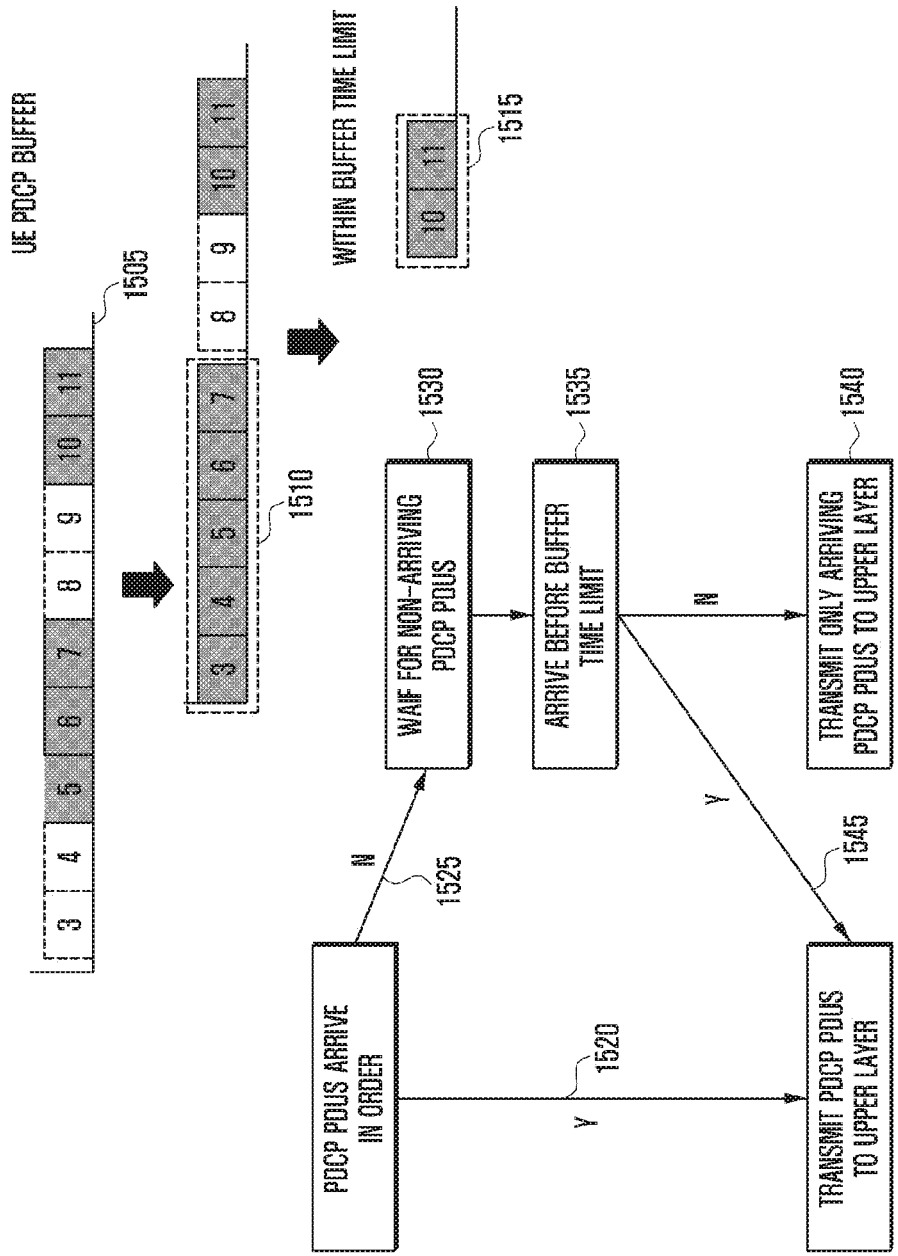
FIG. 15 is a diagram explaining the operation of a buffer at a Packet Data Convergence Protocol (PDCP) end of a terminal according to another embodiment of the present invention.

FIG. 15 is a diagram explaining the operation of a buffer at a Packet Data Convergence Protocol (PDCP) end of a terminal according to another embodiment of the present invention.

According to FIG. 15, the buffer at the PDCP end of the terminal is provided to transmit bearers to an upper end to match the order of PDCP PDUs when the bearers that are split from the PDCP end of the base station and are divided to different paths reach the terminal at different speeds. In this case, the buffer does not unlimitedly wait for the PDUs in the wrong order, but waits for the PDUs for a predetermined time. If the PDUs do not arrive, the buffer may disregard the PDUs that do not arrive, and may send the remaining PDUs up to the upper layer.

Referring to FIG. 15, if the PDCP PDUs 5, 6, 7, 10, and 11 that are in the wrong order arrive through one path (1525) in a state where up to the PDCP PDU 2 is sent to the upper layer (1520), the corresponding PDCP PDUs wait for in the buffer (1505 and 1530). In this case, if the PDCP PDUs 3 and 4 arrive (1535), the PDCP PDUs 3 to 7 are transmitted to the upper layer (1510 and 1545), and the PDCP PDUs 10 and 11 wait for. If the PDCP PDUs do not arrive until a predetermined time limit, the PDCP PDUs 10 and 11 are transmitted to the upper layer even if the PDCP PDUs 8 and 9 are not received (1540).

Figure 16:
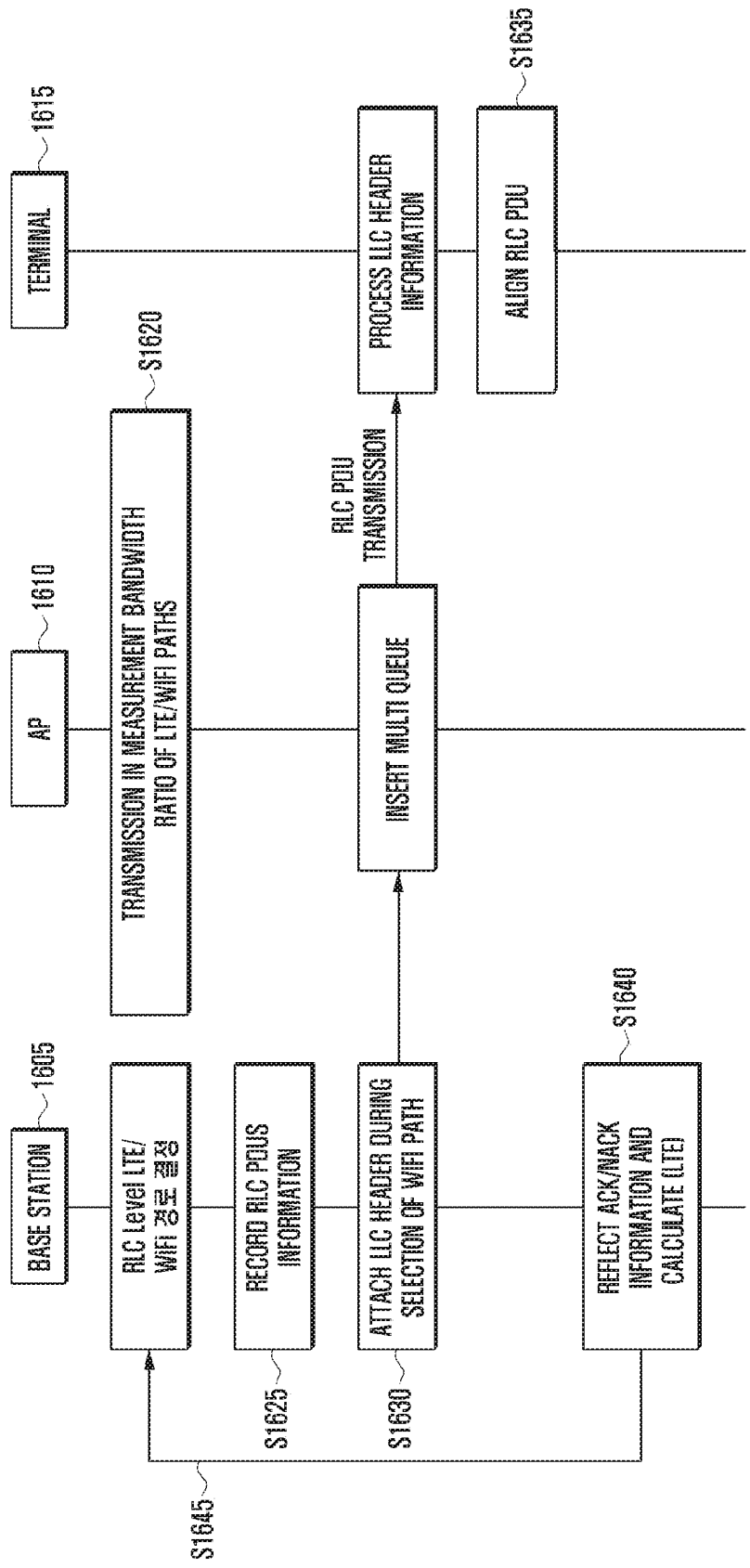
FIG. 16 is a diagram materializing a portion of step C that corresponds to FIG. 4 according to another embodiment of the present invention.

FIG. 16 is a diagram materializing a portion of step C that corresponds to FIG. 4 according to another embodiment of the present invention.

More specifically, FIG. 16 is a diagram illustrating a bearer split process from the RLC level of a base station to an LTE system and a WIFI system if the base station configures a communication method between terminals in an LTE-W mode. Referring to FIG. 16, the base station 1605 may split the bearer in the estimated bandwidth ratio of the LTE/WIFI path to transmit the split bearer (S1620). This is similar to the PDCP bearer split method as illustrated in FIG. 10, in which two paths can be used in balance, and the PDUs that are transmitted through the two paths can reach the terminal 1615 at similar time. The base station 1605 records information just before the transmission of an RLC PDU after determining the path of the RLC PDU (S1625). In the case of using the path to the LTE system, the path may be used as it is without correction, whereas in the case of transmitting the RLC PDU to the terminal 1615 through the AP 1610 using the path to the WIFI system, an additional process, such as attachment of a Logical Link Control (LLC) header to the RLC PDU, is necessary (S1630). The detailed process will be described with reference to FIG. 18. In the case of an RLC AM mode, the bandwidth is calculated through reception of RLC ACK/NACK information (S1640), and the bearer split to the LTE or WIFI system is performed again at operation S1620 through reflection of the bandwidth again (S1645). Since the terminal 1615 receives the RLC PDU that is transmitted through the two paths of LTE and WIFI, the delay may differ, and thus a buffer may be provided to align the order before transmitting the RLC PDU to the upper layer (S1635).

Figure 17:
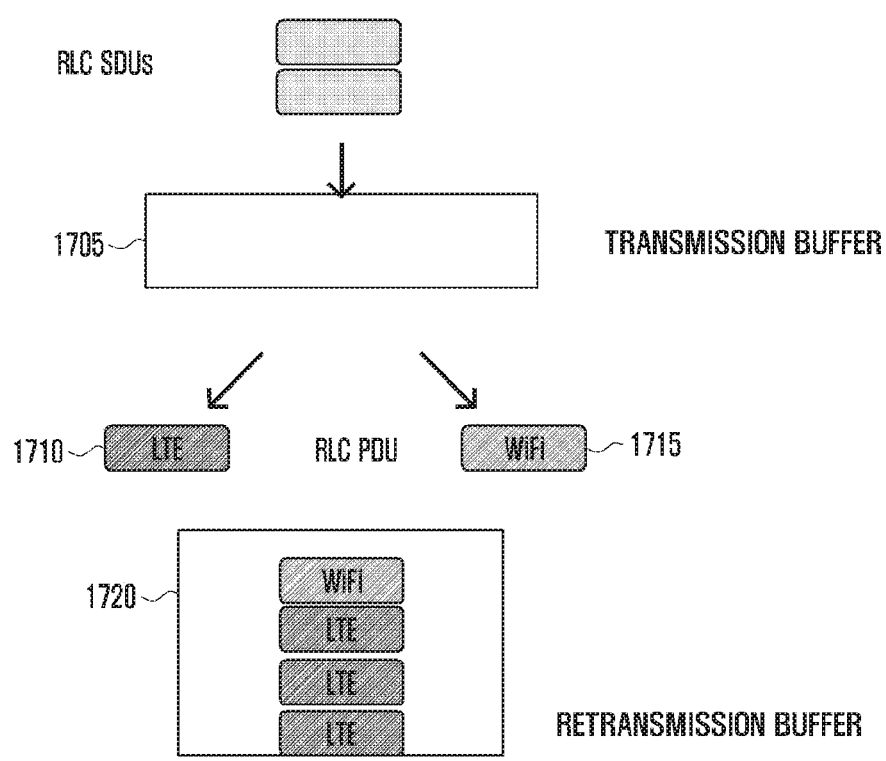
FIG. 17 is a diagram explaining bearer split to an LTE base station and an access point of a wireless LAN at a Radio Link Control (RLC) end of the LTE base according to another embodiment of the present invention.

FIG. 17 is a diagram explaining bearer split to an LTE base station and an access point of a wireless LAN at a Radio Link Control (RLC) end of the LTE base according to another embodiment of the present invention.

Referring to FIG. 17, an RLC Service Data Unit (SDU) of a base station is inserted into a transmission buffer (1705). Thereafter, if a transmission opportunity is assigned from an LTE MAC layer, concatenation/segmentation of the RLC SDU is performed to match a proper size that is reported from the MAC layer to take out the RLC SDU from the transmission buffer (1710). In this case, based on the measured LTE/WIFI path bandwidth ratio, the RLC PDU to be sent to the WIFI path is also taken out, and an RLC header is mounted thereon in the same manner as the RLC PDU that is sent to the LTE path (1715). Thereafter, the RLC PDUs that are sent to both paths are all put in a retransmission buffer, and if ACK comes from the RLC of the terminal, they may be deleted (1720).

Figure 18:
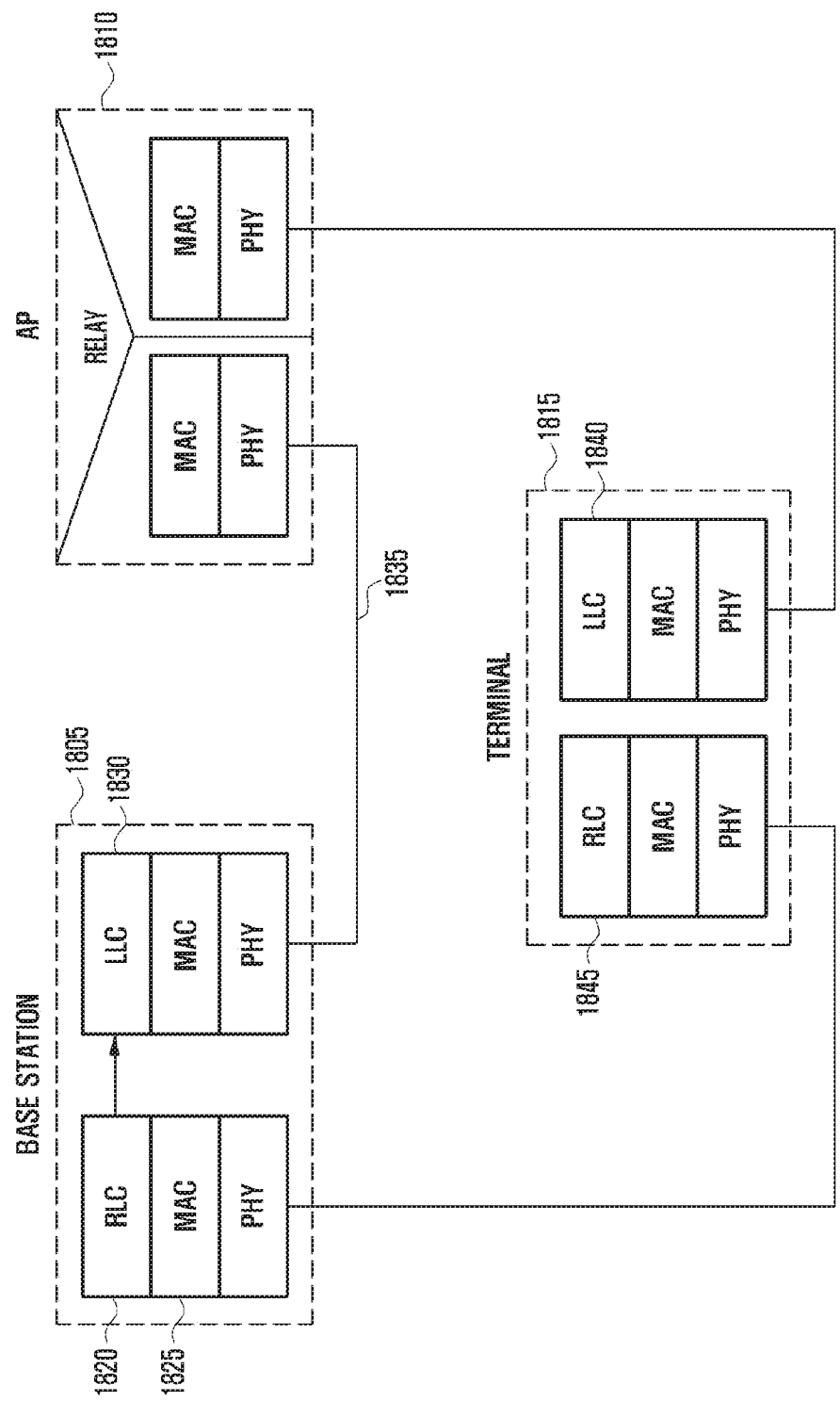
FIG. 18 is a diagram illustrating a protocol structure that coexists between an LTE system and a wireless LAN system if a bearer is split at a Radio Link Control (RLC) end according to another embodiment of the present invention.

FIG. 18 is a diagram illustrating a protocol structure that coexists between an LTE system and a wireless LAN system if a bearer is split at a Radio Link Control (RLC) end according to another embodiment of the present invention.

Referring to FIG. 18, an RLC end of a base station 1805 performs split of a bearer using LTE/WIFI paths. An RLC 1820 of the base station determines scheduling to the LTE or WIFI, and sends the RLC PDU to a MAC 1825 of the LTE system or an LLC 1830 of the WIFI system. In the case where the RLC PDU is transmitted to the MAC 1825 of the base station, the RLC PDU is transmitted to the terminal in the same manner as the communication method of the existing LTE system. In contrast, in the case of scheduling to the WIFI, a Logical Link Control (LLC) header that contains an inherent number that is given to the RLC is attached to the RLC PDU to be transmitted to the AP (1835). The transmission to the AP may be performed using 802.3 Ethernet or wireless network. Explanation related to this has been made with reference to FIG. 11. If an LLC 1840 of the terminal 1815 receives the RLC PDU, it sends the received RLC PDU to an upper RLC 1845 so as to send the RLC PDU up to an upper PDCP to match the order. In this case, a buffer exists in the RLC 1845 of the terminal, and in the case of an RLC AM, if the RLC PDUs are in the wrong order, retransmission is required using a NACK and a reordering timer that are used in the existing LTE system. Further, if the terminal 1815 has received the RLC PDU having a poll field of "1" and the RLC PDUs have been received to match the RLC PDU order up to now, accumulated ACK number may be transmitted to the RLC 1820 of the base station 1805 to delete the RLC PDU that is waiting for in an RLC retransmission buffer for the retransmission.

Figure 19:
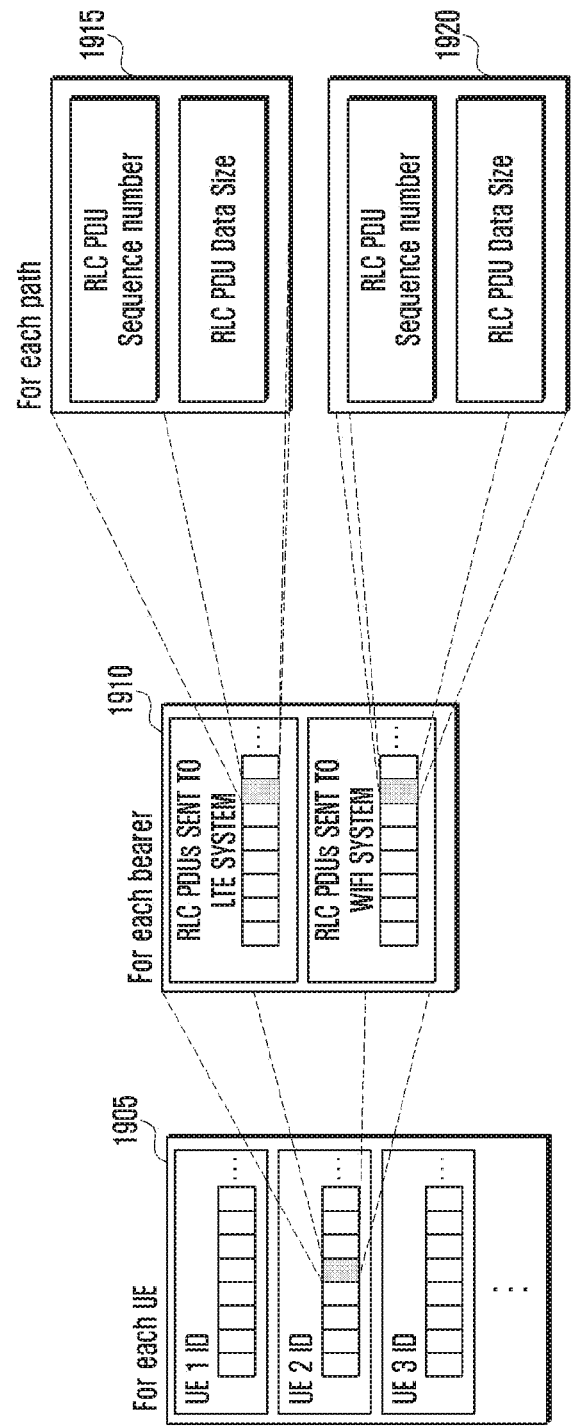
FIG. 19 a diagram illustrating an information storage structure of a Radio Link Control (RLC) end of an LTE base station according to another embodiment of the present invention.

FIG. 19 a diagram illustrating an information storage structure of a Radio Link Control (RLC) end of an LTE base station according to another embodiment of the present invention.

Referring to FIG. 19, information to be stored in an RLC of a base station for LTE/WIFI path selection is indicated. Even in the case of RLC bearer split, in the same manner as in FIG. 4, the base station passes through a process of selecting a communication method, and thus the base station and a terminal possess bearer information of the terminal that uses LTE-W (1905). With respect to respective bearers in which the terminal uses an LTE-W mode (1910), SN of the RLC PDU that is sent to two systems of LTE and WIFI before transmission thereof to an RLC lower layer and an RLC PDU data size are recorded (1915 and 1920). The RLC of the base station is used to measure the bandwidths of both paths on the basis of a time difference between the above-described information and the received RLC ACK. This will be described in detail with reference to FIGS. 20A and 20B.

FIGS. 20A and 20B are diagrams explaining a method for measuring bandwidths of paths of an LTE base station and an access point of a wireless LAN according to an embodiment of the present invention.

Referring to FIGS. 20A and 20B, it can be known that a polling prohibit time for requesting a status PDU that is managed by a base station is similar to an inter ACK arrival time of a terminal. The polling prohibit time is a value that is already known by the base station. Further, the base station may measure an inter ACK interval through measurement of time at which the previous ACK arrived. The bandwidth can be estimated by dividing, by the inter ACK interval, the total sum of RLC PDU sizes 1920 for respective paths from the RLC PDU of which the transmission success is notified through the previous ACK to the RLC PDU of which the transmission success is notified through this ACK.

In the case of measuring the bandwidth using the status PDU as described above, the bandwidth is measured through the total sum of the RLC PDUs that are received at ACK intervals through periodic transmission of the RLC PDUs in the same path as illustrated in FIG. 20B. In particular, an algorithm that is described with reference to FIG. 17 produces and transmits RLC PDUs as much as the bandwidth ratio to the WIFI only in the case where an LTE MAC transmission opportunity occurs, and if the WIFI has a bandwidth that is larger than the bandwidth of the LTE, there is a possibility that they are not sufficiently used (under-utilize). If the bandwidth is measured through periodic execution of the method of FIG. 20B and the value is again reflected in the schedule, it becomes possible to more efficiently use the path that is not sufficiently used.

As another embodiment, a method for measuring the bandwidth will now be described. First, an RLC layer of the base station can measure all LTE/WIFI bandwidths. That is, as described above with reference to FIGS. 12A and 12B, in the same manner as the PDCP bearer split process, there is a method for estimating a bandwidth, in which the base station records information on the RLC PDU that is transmitted to the LTE or WIFI path and it measures the number of unacked PUDs and a delay. According to this method, it is necessary to continuously transmit/receive WIFI MAC ACK information between the AP and the base station. That is, the AP records the size and the start time of the RLC PDU that is transmitted for each bearer, measures a delay between the AP and the terminal through the MAC ACK that is received from the terminal, and measures the bandwidth with the size of PDUs that are transmitted for the time. The measured bandwidth may be periodically transmitted to the base station.

Figure 21:
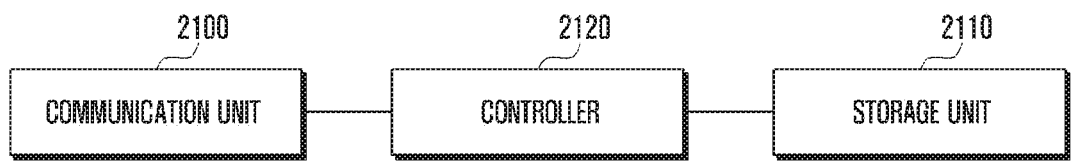
FIG. 21 is a block diagram illustrating the internal structure of an LTE base station according to an embodiment of the present invention.

FIG. 21 is a block diagram illustrating the internal structure of an LTE base station according to an embodiment of the present invention.

Referring to FIG. 21, the base station may include a communication unit 2100, a storage unit 2110, and a controller 2120.

The communication unit may transmit/receive necessary information with at least one of an access point of a wireless LAN and a terminal. The communication unit 2100 may receive access related information from the access point of the wireless LAN or the terminal. Further, the communication unit 2100 may receive communication method preference information that is a basis to determine the communication method from the terminal.

Further, the communication unit 2100 may receive configuration information based on the communication method that is determined by the controller 2120, and may transmit the configuration information to the access point of the wireless LAN or the terminal. The configuration information may include information that is recorded in a PDCP PDU of the base station. In the case where the communication unit 2100 transmits the configuration information to the access point of the wireless LAN, the PDCP PDU may include an LLC header.

The communication unit 2100 may receive an ACK message indicating whether the terminal has received the configuration information from the access point of the wireless LAN or the terminal. The communication unit 2100 may transmit the received ACK message to the controller 2120.

The storage unit 2110 may store therein information that is necessary for the operation of the base station according to the present invention. The storage unit 2110 may store therein information that is received from the communication unit 2100. Further, the storage unit 2110 may store therein access related information that is received from the access point of the wireless LAN or the terminal. Further, the storage unit 2110 may store therein preference information of the communication method that is received from the terminal. The storage unit 2110 may store therein configuration related information of the communication method that is determined by the controller 2120.

The configuration related information that is stored in the storage unit 2110 may include information that is recorded in the PDCP PDU or the RLC PDU. The configuration related information may include at least one of PDCP PDU order related information, information on the number of PDUs that have failed to receive an Acknowledge (ACK) message from the terminal among PDUs that are transmitted to a first network or a second network, and information on a start time at a PDCP end.

The controller 2120 may receive access related information from the terminal and the access point of a second network, and may determine the communication method with the terminal among a plurality of communication methods on the basis of the access related information. The communication methods may include a first network dedicated carrier aggregation, a second network dedicated carrier aggregation, and a carrier aggregation between the first network and the second network.

Further, the controller 2120 may configure a first carrier of the first network and a second carrier of the second network into the terminal if the communication method with the terminal is determined as the carrier aggregation between the first network and the second network. Configuration of the carrier of the first network and the carrier of the second network into the terminal may include configuration of the carrier of the first network and the carrier of the second network into the terminal on the basis of bandwidth information of the first network and the second network, and transmission of the configuration related information to the terminal.

Further, the controller 2120 may operate to receive information on whether the terminal has received the PDCP PDU to the access point of the second network and the terminal, to calculate bandwidths of the first network and the second network on the basis of the information that is received from the access point and the terminal, and to allocate the carrier of the first network and the carrier of the second network to the terminal on the basis of the calculated bandwidth information.

Further, when configuring the carrier of the first network and the carrier of the second network into the terminal, the controller 2120 may record the configuration related information in a Radio Link Control (RLC) Protocol Data Unit (PDU), and may transmit the RLC PDU in which the information is recorded to the terminal and the access point of the second network.

Figure 22:
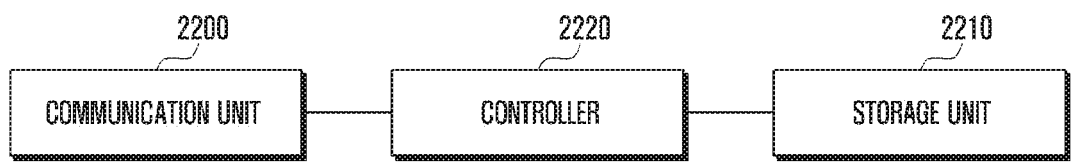
FIG. 22 is a block diagram illustrating the internal structure of an access point of a wireless LAN according to an embodiment of the present invention.

FIG. 22 is a block diagram illustrating the internal structure of an access point of a wireless LAN according to an embodiment of the present invention.

Referring to FIG. 22, the access point may include a communication unit 2200, a storage unit 2210, and a controller 2220.

The communication unit 2200 may transmit/receive necessary information with at least one of a base station of an LTE and a terminal. The communication unit 2200 may transmit access related information to the LTE base station. Further, the communication unit 2200 may receive configuration related information for a communication method between the base station and the terminal from the LTE base station. The communication methods may include a first network dedicated carrier aggregation, a second network dedicated carrier aggregation, and a carrier aggregation between the first network and the second network.

Further, the communication unit 2200 may transmit the configuration related information that is received from the base station to the terminal. Further, the communication unit 2200 may receive an ACK message indicating whether the terminal has received the configuration related information from the terminal. The communication unit 2200 may transmit necessary information to the storage unit 2210 or the controller 2220.

The storage unit 2210 may store therein information that is received from the communication unit 2200. Further, the storage unit 2210 may store therein information that is received from the controller 2220. More specifically, the storage unit 2210 may store therein configuration related information that is received from the LTE base station. The storage unit 2210 may include information on a list that include an IP address of the terminal that is included in the configuration related information and a MAC address that is the access related information of the terminal. The storage unit 2210 may provide the configuration related information and the information on the list to the controller 2220 to acquire the MAC address of the terminal that corresponds to the received configuration related information.

The controller 2220 may operate to receive configuration related information for configuring a carrier of the second network into the terminal from the base station of the first network using a plurality of queues and to transmit the configuration related information to the terminal on the basis of terminal related information included in the configuration related information if the base station of the first network and the terminal communicate with each other in a carrier aggregation method between the first network and the second network.

The configuration related information may include information that is recorded in a Packet Data Convergence Protocol (PDCP) Protocol Data Unit (PDU). The PDCP PDU may include a Logical Link Control (LLC) header, and the LLC header may include order related information of the PDCP PDU and the allocated bearer related information. Further, the controller 2220 may further operate to transmit information on whether the configuration related information has been received, which is received from the terminal, to the base station.

Figure 23:
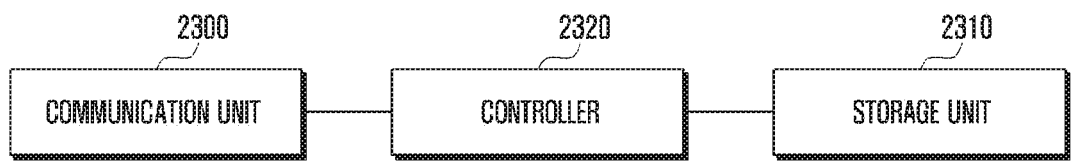
FIG. 23 is a block diagram illustrating the internal structure of a terminal according to an embodiment of the present invention.

FIG. 23 is a block diagram illustrating the internal structure of a terminal according to an embodiment of the present invention.

Referring to FIG. 23, the terminal may include a communication unit 2300, a storage unit 2310, and a controller 2320.

The communication unit may transmit/receive necessary information with at least one of an LTE base station and an access point of a wireless LAN. The communication unit 2300 may transmit access related information to the base station. The access related information may include access related information of a terminal or the access point of the wireless LAN. The communication unit 2300 may transmit communication method preference information that is a basis to determine the communication method between the base station and the terminal to the base station.

Further, the communication unit 2300 may receive configuration related information on the determined communication method from the base station or the access point. The configuration related information may include a PDCP PDU or an RLC PDU. If the configuration related information is received, the communication unit 2300 may transmit an ACK message indicating whether the configuration information is received to the base station or the access point.

The storage unit 2310 may store therein information that is necessary for the operation of the base station according to the present invention. The storage unit 2310 may store therein terminal preference information that is input from a user. Further, the storage unit 2310 may store therein configuration related information that is received from the base station or the access point. Further, in order to align the configuration related information, the storage unit 2310 may include a buffer. The storage unit 2310 may transmit the stored information to the controller 2320 or the communication unit 2300.

The controller 2320 may operate to transmit access related information of an access point of the second network and the terminal to the base station of the first network, and to communicate with at least one of the base station of the first network and the access point of the second network in accordance with a communication method that is determined by the base station of the first network among a plurality of communication methods on the basis of the transmitted access related information. The plurality of communication methods include a first network dedicated carrier aggregation, a second network dedicated carrier aggregation, and a carrier aggregation between the first network and the second network.

Further, the controller 2320 may further operate to transmit preference information on the communication method to the base station. The preference information may be used to determine the communication method among the plurality of communication methods. Further, the controller 2320 may further operate to receive the configuration related information of a carrier of the first network or a carrier of the second network from the base station of the first network or the access point of the second network if the communication method with the terminal is determined as the carrier aggregation between the first network and the second network. The configuration related information may include information that is recorded in at least one of a Packet Data Convergence Protocol (PDCP) Protocol Data Unit (PDU) and a Radio Link Control (RLC) Protocol Data Unit (PDU). Further, if at least one of the PDCP PDU and the RLC PDU is received from the access point of the second network, the received PDCP PDU or RLC PDU may include a Logical Link Control (LLC) header.

Further, if the configuration related information is received, the controller 2320 may further operate to transmit information on whether the configuration related information has been received to the base station of the first network and the access point of the second network.

Meanwhile, preferred embodiments of the present invention disclosed in this specification and drawings and specific terms used therein are illustrated to present only specific examples in order to clarify the technical contents of the present invention and help understanding of the present invention, but are not intended to limit the scope of the present invention. It will be evident to those skilled in the art that various implementations based on the technical spirit of the present invention are possible in addition to the disclosed embodiments.

The invention claimed is:

1. A method performed by a base station of a first network in a wireless communication system, comprising:
receiving, from a terminal and an access point of a second network, throughput information;
receiving, from the terminal, preference information for a preference of a communication mode;
determining the communication mode with the terminal among a plurality of communication modes based on the throughput information and the preference information, the plurality of communication modes including a first network dedicated carrier mode, a second network dedicated carrier mode, and a carrier aggregation mode between the first network and the second network,
responsive to the determined communication mode being the carrier aggregation mode, recording configuration related information in a Packet Data Convergence Protocol (PDCP) Protocol Data Unit (PDU); and
responsive to the determined communication mode being the carrier aggregation mode, transmitting the PDCP PDU in which the configuration related information is recorded to at least one of the terminal or the access point of the second network,
wherein the communication mode for each bearer is determined, among the carrier aggregation mode and the second network dedicated carrier mode, based on the throughput information, in response to the first network dedicated carrier mode and the second network dedicated carrier mode not being preferred according to the preference information.

2. The method of claim 1, further comprising receiving Acknowledgement (ACK) information on whether the PDCP PDU has been received from the access point of the second network and the terminal,
wherein the ACK information that is received from the terminal includes a PDCP Sequence Number (SN) of which transmission has succeeded, and
the ACK information that is received from the access point of the second network includes at least one of the PDCP SN of which the transmission has succeeded or a GPRS Tunneling Protocol—User plane tunneling (GTP-U) SN of which transmission has succeeded.

3. The method of claim 1, wherein the first network dedicated carrier mode is related to WIFI, the second network dedicated carrier mode is related to LTE and the carrier aggregation mode is related to LTE-W.

4. A method performed by a terminal in a wireless communication system, comprising:
transmitting, to a base station of a first network, throughput information of an access point of a second network;
transmitting, to the base station, preference information for a preference of a communication mode; and
communicating with at least one of the base station of the first network or the access point of the second network in accordance with the communication mode that is determined by the base station of the first network among a plurality of communication modes based on the transmitted throughput information and the transmitted preference information, the plurality of communication modes including a first network dedicated carrier mode, a second network dedicated carrier mode, and a carrier aggregation mode between the first network and the second network,
receiving configuration related information of a carrier of the first network or a carrier of the second network from the base station of the first network or the access point of the second network when the communication mode with the terminal is determined as the carrier aggregation mode between the first network and the second network,
wherein the configuration related information includes information that is recorded in a Packet Data Convergence Protocol (PDCP) Protocol Data Unit (PDU), and
wherein the communication mode for each bearer is determined, among the carrier aggregation mode and the second network dedicated carrier mode, based on the throughput information, in response to the first network dedicated carrier mode and the second network dedicated carrier mode not being preferred according to the preference information.

5. The method of claim 4, further comprising transmitting information on whether the configuration related information has been received by the base station of the first network and the access point of the second network if the configuration related information is received,
wherein Acknowledgement (ACK) information that is received from the terminal includes a PDCP Sequence Number (SN) of which transmission has succeeded.

6. A base station of a first network in a wireless communication system, comprising:
a transceiver; and
a controller configured to:
receive, from a terminal and an access point via the transceiver, throughput information of a second network,
receive, from the terminal via the transceiver, preference information for a preference of a communication mode,
determine a communication mode with the terminal among a plurality of communication modes based on the throughput information and the preference information, the plurality of communication modes including a first network dedicated carrier mode, a second network dedicated carrier mode, and a carrier aggregation mode between the first network and the second network,
responsive to the determined communication mode being the carrier aggregation mode, record configuration related information in a Packet Data Convergence Protocol (PDCP) Protocol Data Unit (PDU), and
responsive to the determined communication mode being the carrier aggregation mode, transmit the PDCP PDU in which the configuration related information is recorded to at least one of the terminal or the access point of the second network,
wherein the communication mode for each bearer is determined, among the carrier aggregation mode and the second network dedicated carrier mode, based on the throughput information, in response to the first network dedicated carrier mode and the second network dedicated carrier mode not being preferred according to the preference information.

7. The base station of claim 6, wherein the controller is further configured to receive Acknowledgement (ACK) information on whether the PDCP PDU has been received from the access point of the second network and the terminal,
  wherein the ACK information that is received from the terminal includes a PDCP Sequence Number (SN) of which transmission has succeeded, and
  the ACK information that is received from the access point of the second network includes at least one of the PDCP SN of which the transmission has succeeded or a GPRS Tunneling Protocol—User plane tunneling (GTP-U) SN of which transmission has succeeded.

8. The base station of claim 6, wherein the first network dedicated carrier mode is related to WIFI, the second network dedicated carrier mode is related to LTE and the carrier aggregation mode is related to LTE-W.

9. A terminal supporting a carrier aggregation in a wireless communication system, comprising:
  a transceiver; and
  a controller configured to:
    transmit, to a base station of a first network via the transceiver, throughput information of an access point of a second network and the terminal,
    transmit, to the base station via the transceiver, preference information for a preference of a communication mode, and
    communicate with at least one of the base station of the first network or the access point of the second network in accordance with a communication mode that is determined by the base station of the first network among a plurality of communication modes based on the transmitted throughput information and the preference information, the plurality of communication modes including a first network dedicated carrier mode, a second network dedicated carrier mode, and a carrier aggregation mode between the first network and the second network, and
  receive configuration related information of a carrier of the first network or a carrier of the second network from the base station of the first network or the access point of the second network when the communication mode with the terminal is determined as the carrier aggregation between the first network and the second network,
    wherein the configuration related information includes information that is recorded in a Packet Data Convergence Protocol (PDCP) Protocol Data Unit (PDU), and
    wherein the communication mode for each bearer is determined, among the carrier aggregation mode and the second network dedicated carrier mode, based on the throughput information, in response to the first network dedicated carrier mode and the second network dedicated carrier mode not being preferred according to the preference information.

10. The terminal of claim 9, wherein the controller is further configured to transmit information on whether the configuration related information has been received by the base station of the first network and the access point of the second network if the configuration related information is received,
  wherein Acknowledgement (ACK) information that is received from the terminal includes a PDCP Sequence Number (SN) of which transmission has succeeded.

* * * * *